(12) United States Patent
Mei et al.

(10) Patent No.: US 12,499,925 B2
(45) Date of Patent: Dec. 16, 2025

(54) MEMORY AND OPERATION METHOD THEREOF AND MEMORY SYSTEM

(71) Applicant: YANGTZE MEMORY TECHNOLOGIES CO., LTD., Wuhan (CN)

(72) Inventors: Xiaodong Mei, Wuhan (CN); Daesik Song, Wuhan (CN); Huangpeng Zhang, Wuhan (CN); Debo Wei, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 213 days.

(21) Appl. No.: 18/371,749

(22) Filed: Sep. 22, 2023

(65) Prior Publication Data
US 2025/0078896 A1    Mar. 6, 2025

(30) Foreign Application Priority Data

Sep. 4, 2023  (CN) .......................... 202311142821.4

(51) Int. Cl.
*G11C 11/406*  (2006.01)
(52) U.S. Cl.
CPC ................. *G11C 11/406* (2013.01)
(58) Field of Classification Search
CPC .................................................. G11C 11/406
USPC ........................................................ 365/222
See application file for complete search history.

(56) References Cited

U.S. PATENT DOCUMENTS

| | | | |
|---|---|---|---|
| 11,467,960 B1* | 10/2022 | Dimond | G06F 11/3037 |
| 2018/0174638 A1 | 6/2018 | Ku et al. | |
| 2022/0415427 A1* | 12/2022 | Pan | G11C 29/44 |
| 2023/0178140 A1* | 6/2023 | Cho | G11C 11/40603 |
| | | | 365/222 |

FOREIGN PATENT DOCUMENTS

| | | |
|---|---|---|
| CN | 114067876 A | 2/2022 |
| CN | 115641888 A | 1/2023 |
| CN | 115910146 A | 4/2023 |
| CN | 116486887 A | 7/2023 |
| CN | 116543824 A | 8/2023 |
| KR | 20130127346 A | 11/2013 |

* cited by examiner

*Primary Examiner* — Connie C Yoha
(74) *Attorney, Agent, or Firm* — BAYES PLLC

(57) ABSTRACT

According to one aspect of the present disclosure, a memory is provided. The memory may include a row hammer control circuit including a plurality of counters. Each of the plurality of counters may count a number of accesses of one memory row. Each of the plurality of counters may be configured to generate a first count value. The memory may include an adjustment circuit connected with the plurality of counters. The adjustment circuit may reset each of the plurality of counters when each of a plurality of first count values reaches a target threshold. The adjustment circuit may adjust each of the first count values by a same offset value to generate a plurality of second count values. The row hammer control circuit may determine a target memory row according to the plurality of second count values.

20 Claims, 10 Drawing Sheets

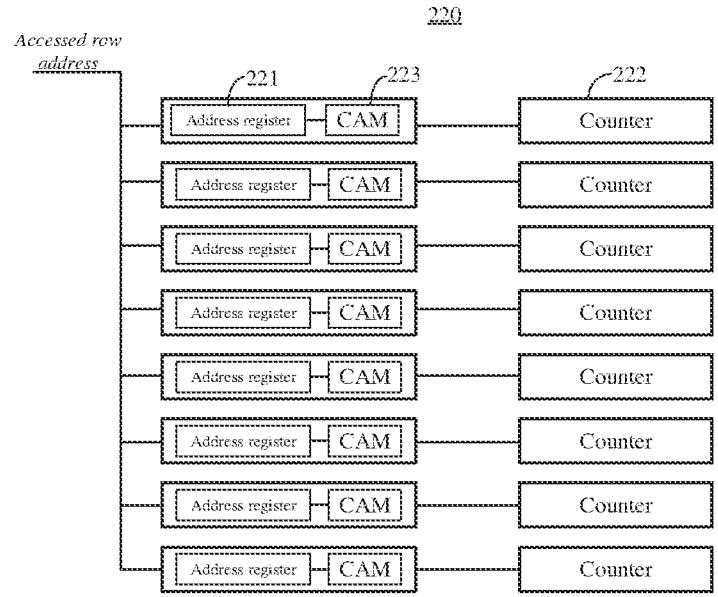
FIG. 4b
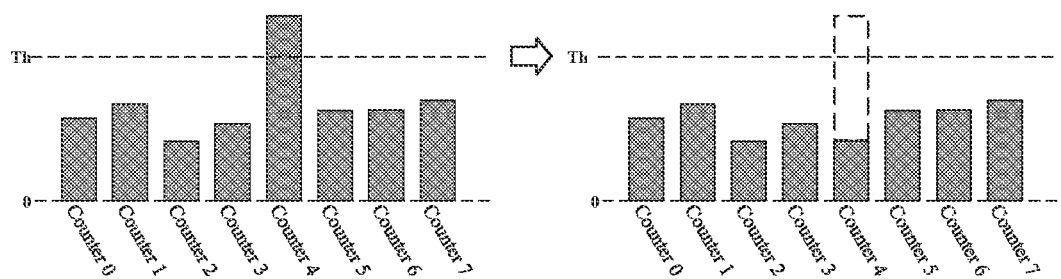
FIG. 5
FIG. 6a

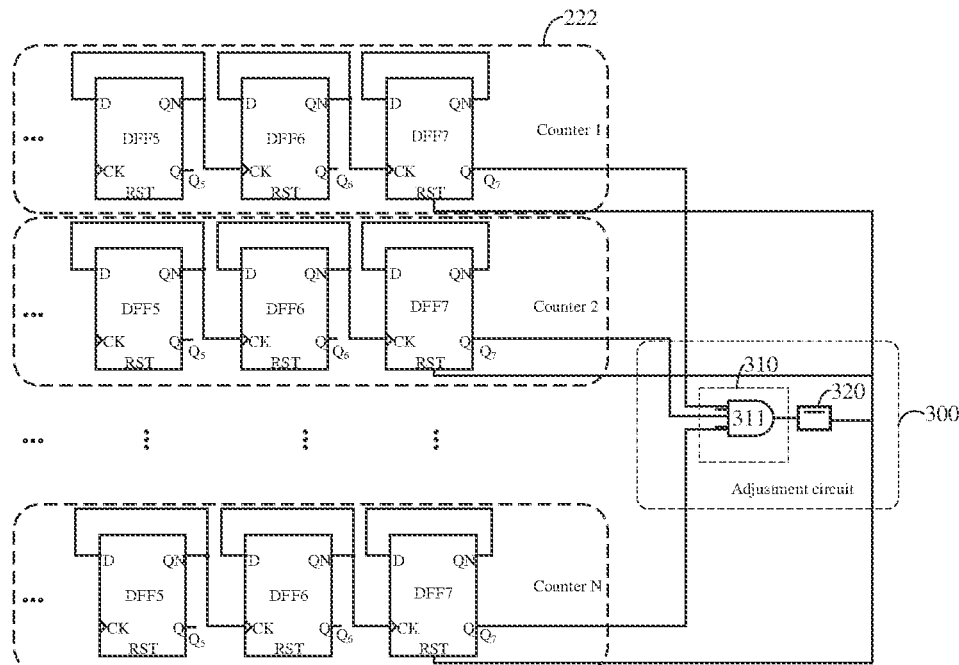
FIG. 10
| Address register | Counter | |
|---|---|---|
| | Hexadecimal | Binary |
| 0XA0 | 0X8F | 10001111 |
| 0XB0 | 0X7F | 01111111 |
| 0XC0 | 0X8A | 10001010 |
| 0XD0 | 0X8B | 10001011 |
ACT3 0XB0 ↓
| Address register | Counter | |
|---|---|---|
| | Hexadecimal | Binary |
| 0XA0 | 0X8F | 10001111 |
| 0XB0 | 0X80 | 10000000 |
| 0XC0 | 0X8A | 10001010 |
| 0XD0 | 0X8B | 10001011 |
Reset flip-flops DFF7 ↓
| Address register | Counter | |
|---|---|---|
| | Hexadecimal | Binary |
| 0XA0 | 0X0F | 00001111 |
| 0XB0 | 0X00 | 00000000 |
| 0XC0 | 0X0A | 00001010 |
| 0XD0 | 0X0B | 00001011 |
FIG. 11
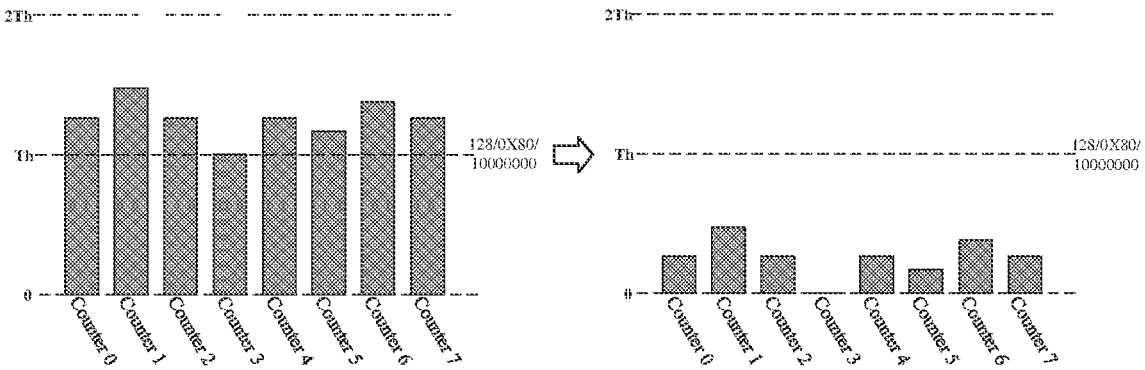
FIG. 12

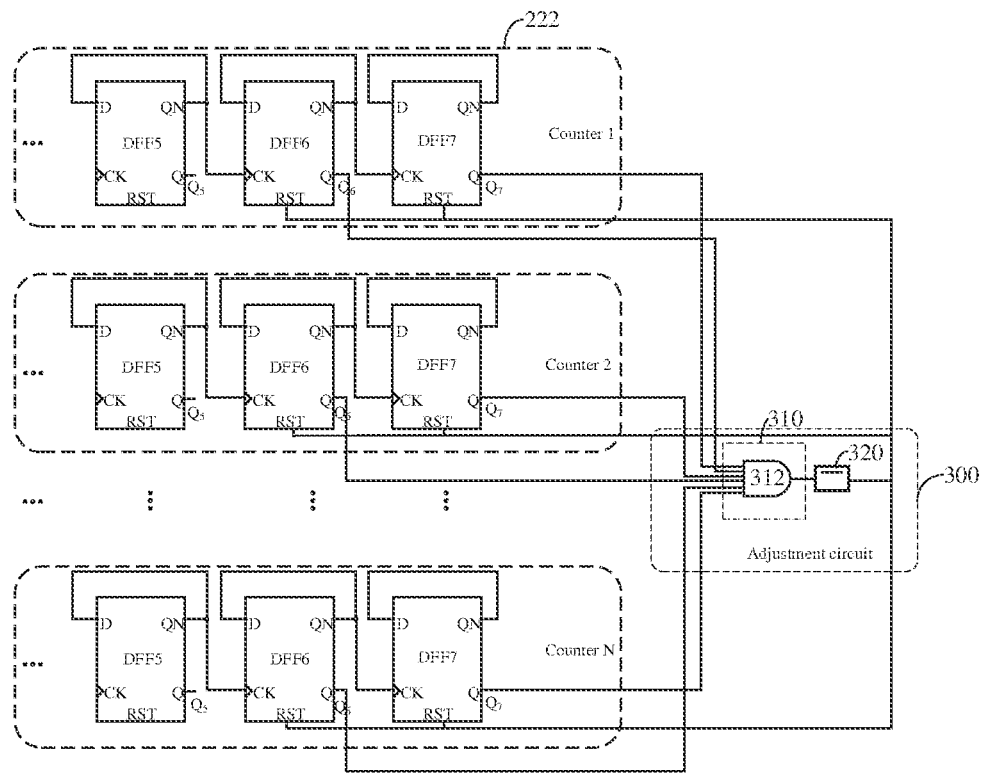
FIG. 13
| Address register | Counter | | | Address register | Counter | | | Address register | Counter | |
|---|---|---|---|---|---|---|---|---|---|---|
| | Hexadecimal | Binary | | | Hexadecimal | Binary | | | Hexadecimal | Binary |
| 0XA0 | 0XDF | 11011111 | | 0XA0 | 0XDF | 11011111 | | 0XA0 | 0X1F | 00011111 |
| 0XB0 | 0XCA | 11001010 | | 0XB0 | 0XCA | 11001010 | | 0XB0 | 0X0A | 00001010 |
| 0XC0 | 0XBF | 10111111 | | 0XC0 | 0XC0 | 11000000 | | 0XC0 | 0X00 | 00000000 |
| 0XD0 | 0XFB | 11111011 | | 0XD0 | 0XFB | 11111011 | | 0XD0 | 0X3B | 00111011 |
ACT4 0XC0 ↓      Reset flip-flops DFF7 and DFF6 →
FIG. 14
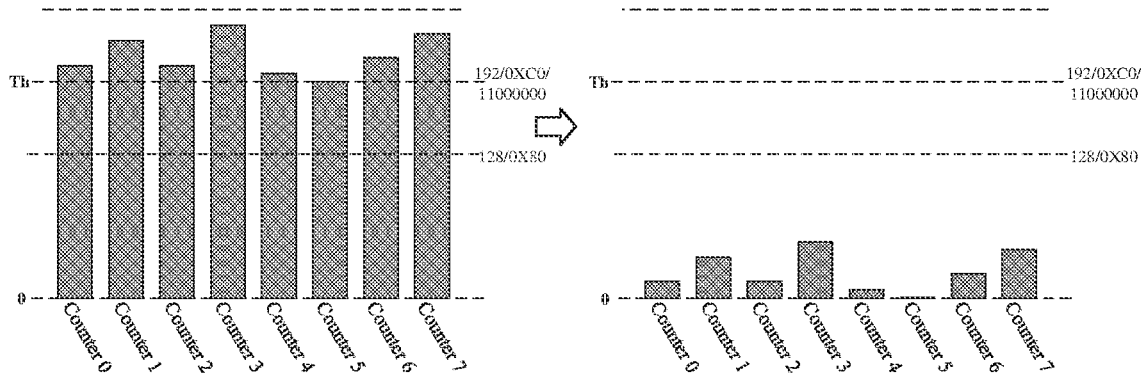
FIG. 15

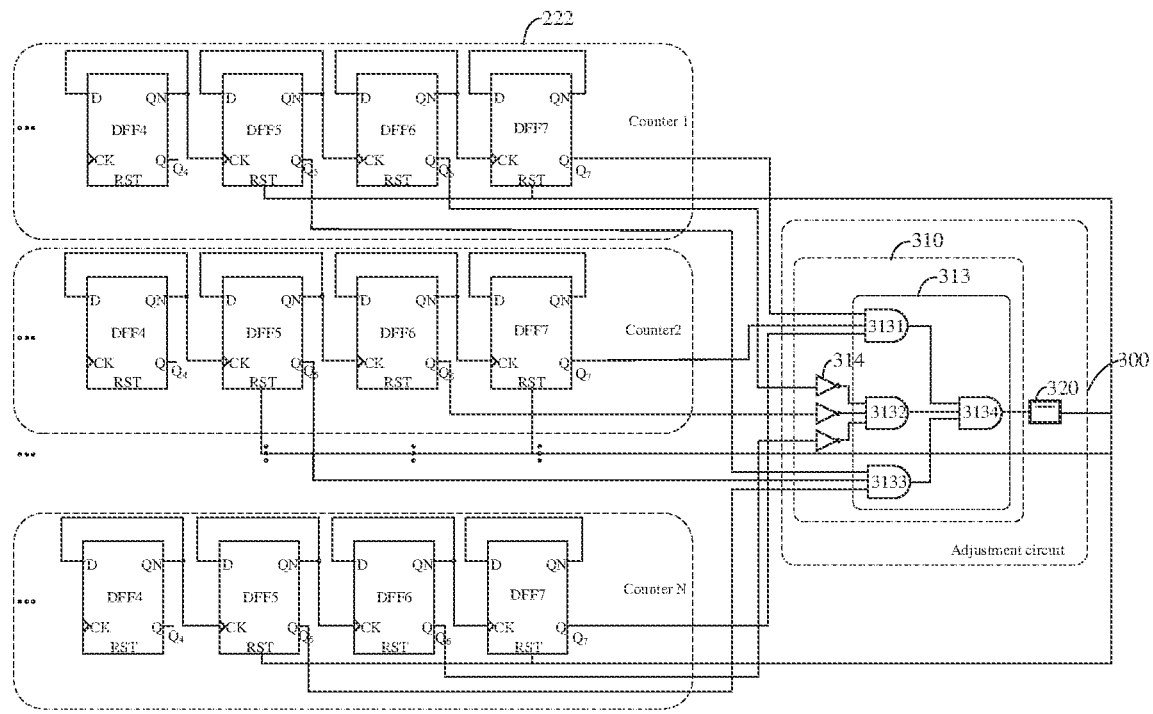
FIG. 16
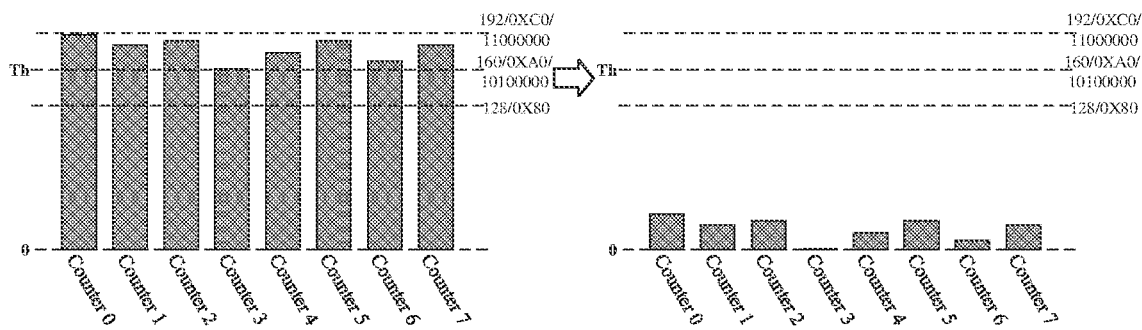
FIG. 17
FIG. 18

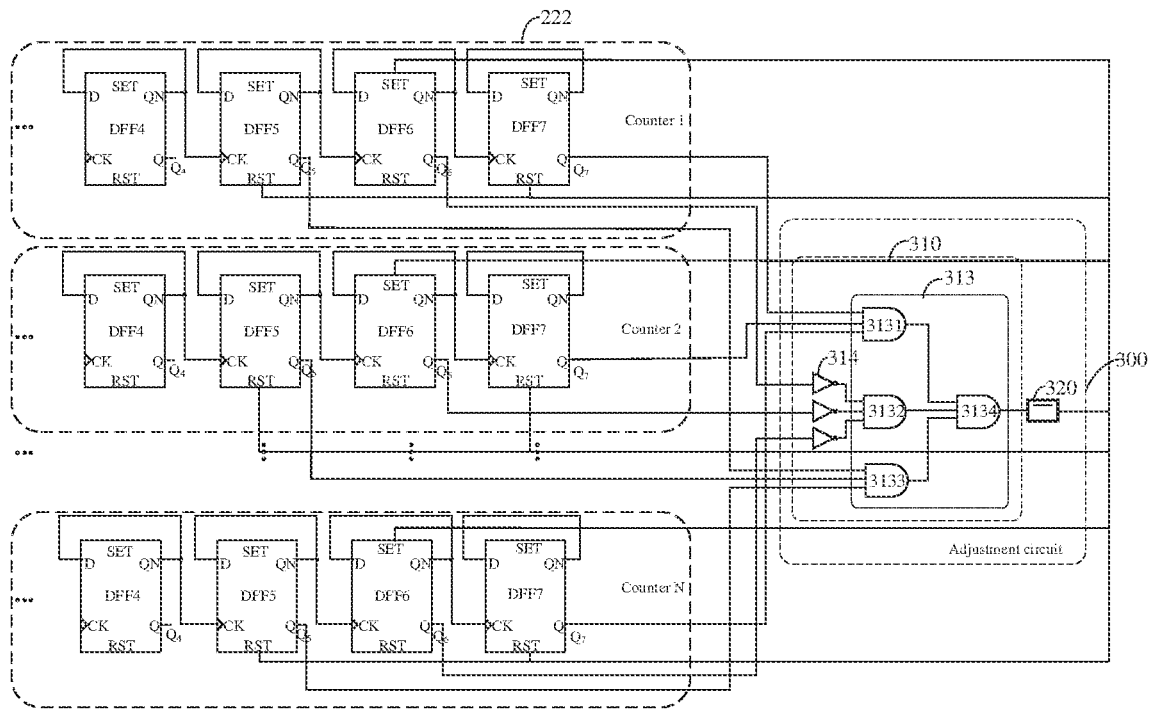
FIG. 19
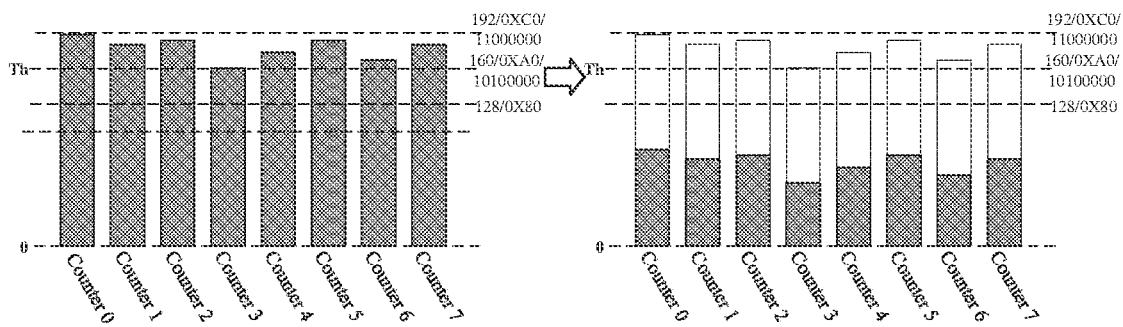
FIG. 20
FIG. 21

MEMORY AND OPERATION METHOD THEREOF AND MEMORY SYSTEM

CROSS-REFERENCE TO RELATED APPLICATIONS

This application claims the benefit of priority to C.N. application No. 202311142821.4, filed on Sep. 4, 2023, which is incorporated herein by reference in its entirety.

TECHNICAL FIELD

The present disclosure relates to the technical field of semiconductors, and particularly to a memory and an operation method thereof, and a memory system.

BACKGROUND

Counters are the most commonly used logic circuits in integrated circuits. The counters are used in integrated circuits mainly to count some entries to achieve functions such as measurement, counting, control, and frequency division, etc. For example, in a row hammer control circuit that resolves the problem of a row hammer effect, the counters may count the number of accesses of a memory row, so that the row hammer control circuit determines an aggressor row based on a counting result, and refreshes a victim row adjacent to the aggressor row.

SUMMARY

According to one aspect of the present disclosure, a memory is provided. The memory may include a row hammer control circuit including a plurality of counters. Each of the plurality of counters may be configured to count a number of accesses of one memory row. Each of the plurality of counters may be configured to generate a first count value. The memory may include an adjustment circuit connected with the plurality of counters. The adjustment circuit may be configured to reset each of the plurality of counters when each of a plurality of first count values reaches a target threshold. The adjustment circuit may be configured to adjust each of the first count values by a same offset value to generate a plurality of second count values. The row hammer control circuit may be further configured to determine a target memory row according to the plurality of second count values.

In some implementations, each of the plurality of counters comprises a plurality of flip-flops each corresponding to one significant bit of the first count value, and levels of output terminals of the flip-flops indicate values of the significant bits. In some implementations, when values of preset significant bits of the significant bits of the plurality of first count values are the same, the adjustment circuit is configured to reset levels of output terminals of flip-flops corresponding to the preset significant bits, to set values of the preset significant bits to preset values, the first count values for which the preset significant bits are reset being updated to the second count values.

In some implementations, preset significant bits of each of the first count values may include one significant bit or a plurality of significant bits.

In some implementations, the preset significant bits are most significant bits of the plurality of significant bits of the first count values. In some implementations, the preset significant bits may include a plurality of significant bits sequentially set from most significant bits to low significant bits of the first count values, and a number of significant bits of the preset significant bits is less than a number of significant bits of the first count values.

In some implementations, the adjustment circuit may include an adjustment unit. In some implementations, a plurality of input terminals of the adjustment unit may be connected with output terminals of flip-flops corresponding to the preset significant bits in the plurality of counters. In some implementations, an output terminal of the adjustment unit may be connected with reset terminals or set terminals of flip-flops corresponding to the preset significant bits in the plurality of counters. In some implementations, when values of preset significant bits of the plurality of first count values are the same, the adjustment unit may be configured to send a control signal to reset terminals or set terminals of flip-flops corresponding to the preset significant bits, to set values of the preset significant bits to preset values.

In some implementations, the preset values are initial values of the preset significant bits. In some implementations, the adjustment unit may be configured to send the control signal to the reset terminals of flip-flops corresponding to the preset significant bits, to set values of the preset significant bits to the initial values.

In some implementations, the adjustment unit may include an AND gate circuit. In some implementations, a plurality of input terminals of the AND gate circuit may be respectively connected with output terminals of flip-flops corresponding to preset significant bits in the plurality of counters. In some implementations, an output terminal of the AND gate circuit may be connected with reset terminals of flip-flops corresponding to preset significant bits in the plurality of counters. In some implementations, when levels of output terminals of flip-flops corresponding to preset significant bits in the plurality of counters are the same and a level of the output terminal of the flip-flop corresponding to each significant bit of the preset significant bits is different from an initial level, the adjustment unit may be configured to send the control signal to reset terminals of flip-flops corresponding to the preset significant bits, to set output terminals of flip-flops corresponding to the preset significant bits to the initial level, and the initial level indicates the initial values.

In some implementations, the preset significant bits may include first-type significant bits and second-type significant bits. In some implementations, the adjustment unit may include a plurality of NOT gate circuits. In some implementations, the input terminals of the plurality of NOT gate circuits may be connected with output terminals of flip-flops corresponding to first-type significant bits in the plurality of counters. In some implementations, an AND gate circuit may include a plurality of first input terminals and a plurality of second input terminals. In some implementations, the first input terminals may be connected with output terminals of the NOT gate circuits. In some implementations, the plurality of second input terminals may be connected with output terminals of flip-flops corresponding to second-type significant bits in the plurality of counters. In some implementations, an output terminal of the AND gate circuit may be connected with reset terminals of flip-flops corresponding to second-type significant bits in the plurality of counters. In some implementations, when levels of output terminals of flip-flops corresponding to first-type significant bits in the plurality of counters are equal to an initial level, and levels of the output terminals of flip-flops corresponding to the second-type significant bits are the same and are different from the initial level, the adjustment unit may be configured to send the control signal to reset terminals of flip-flops corresponding to the second-type significant bits, to set levels of output terminals of flip-flops corresponding to the second-type significant bits to the initial level.

In some implementations, the control signal may include one effective pulse. In some implementations, the adjustment circuit further may include a delay unit. In some implementations, one terminal of the delay unit may be connected with an output terminal of the adjustment unit. In some implementations, the other terminal may be connected with the reset terminals or the set terminals of flip-flops corresponding to preset significant bits in the plurality of counters. In some implementations, the delay unit may be configured to increase a pulse width of the effective pulse.

In some implementations, the row hammer control circuit may be configured to compare the plurality of second count values. In some implementations, the row hammer control circuit may be configured to determine a memory row corresponding to a largest count value of the plurality of second count values as the target memory row. In some implementations, the row hammer control circuit may be further configured to determine an adjacent memory row of the target memory row according to the target memory row. In some implementations, the memory may further include a refresh circuit connected with the row hammer control circuit. In some implementations, the refresh circuit may be configured to perform a refresh operation on the adjacent memory row of the target memory row.

According to another aspect of the present disclosure, a memory system is provided. The memory system may include a memory. The memory may include a row hammer control circuit including a plurality of counters. Each of the plurality of counters may be configured to count a number of accesses of one memory row. Each of the plurality of counters may be configured to generate a first count value. The memory may include an adjustment circuit connected with the plurality of counters. The adjustment circuit may be configured to reset each of the plurality of counters when each of a plurality of first count values reaches a target threshold. The adjustment circuit may be configured to adjust each of the first count values by a same offset value to generate a plurality of second count values. The row hammer control circuit may be further configured to determine a target memory row according to the plurality of second count values. The memory system may include a memory controller connected with the memory and configured to control the memory.

In some implementations, each of the plurality of counters comprises a plurality of flip-flops each corresponding to one significant bit of the first count value, and levels of output terminals of the flip-flops indicate values of the significant bits. In some implementations, when values of preset significant bits of the significant bits of the plurality of first count values are the same, the adjustment circuit is configured to reset levels of output terminals of flip-flops corresponding to the preset significant bits, to set values of the preset significant bits to preset values, the first count values for which the preset significant bits are reset being updated to the second count values.

In some implementations, preset significant bits of each of the first count values may include one significant bit or a plurality of significant bits.

In some implementations, the preset significant bits are most significant bits of the plurality of significant bits of the first count values. In some implementations, the preset significant bits may include a plurality of significant bits sequentially set from most significant bits to low significant bits of the first count values, and a number of significant bits of the preset significant bits is less than a number of significant bits of the first count values.

According to a further aspect of the present disclosure, a method of operating a memory is provided. The method may include counting respectively, by using a plurality of counters, numbers of accesses of a plurality of memory rows. The method may include generating, by using the plurality of counters, a plurality of first count values. The method may include resetting each of the plurality of counters when each of the plurality of first count values reaches a target threshold. The method may include adjusting each of the first count values by a same offset value to generate a plurality of second count values. The method may include determining a target memory row based on the plurality of second count values. The method may include performing a refresh operation on an adjacent memory row of the target memory row.

In some implementations, each of the plurality of counters comprises a plurality of flip-flops each corresponding to one significant bit of the first count value, and levels of output terminals of the flip-flops indicate values of the significant bits. In some implementations, the resetting each of the plurality of counters when each of the plurality of first count values reaches the target threshold may include resetting levels of output terminals of flip-flops corresponding to preset significant bits to set values of the preset significant bits to preset values when values of preset significant bits of significant bits of the plurality of first count values are the same. In some implementations, the first count values for which the preset significant bits are reset may be updated to the second count values.

In some implementations, preset significant bits of each of the first count values may include one significant bit or a plurality of significant bits.

In some implementations, the preset significant bits may be most significant bits of a plurality of significant bits of the first count values. In some implementations, the preset significant bits may include a plurality of significant bits sequentially set from most significant bits to low significant bits of the first count values, and a number of significant bits of the preset significant bits may be less than a number of significant bits of the first count values.

In some implementations, the memory may include an adjustment circuit. In some implementations, the adjustment circuit may include an adjustment unit. In some implementations, a plurality of input terminals of the adjustment unit may be connected with output terminals of flip-flops corresponding to the preset significant bits in the plurality of counters. In some implementations, an output terminal of the adjustment unit may be connected with reset terminals or set terminals of flip-flops corresponding to the preset significant bits in the plurality of counters. In some implementations, the resetting the levels of output terminals of flip-flops corresponding to the preset significant bits to set values of the preset significant bits to preset values when values of preset significant bits in significant bits of the plurality of first count values are the same may include, when values of preset significant bits of the plurality of first count values are the same, sending a control signal to reset terminals or set terminals of flip-flops corresponding to the preset significant bits, to set values of the preset significant bits to preset values.

In some implementations, the adjustment circuit may further include a delay unit. In some implementations, one terminal of the delay unit may be connected with the output terminal of the adjustment unit. In some implementations, the other terminal may be connected with the reset terminals or the set terminals of flip-flops corresponding to preset significant bits in the plurality of counters. In some implementations, the control signal may include one effective pulse. In some implementations, the method may include increasing a pulse width of the effective pulse of the control signal.

In the memory provided in the examples of the present disclosure, an adjustment circuit for counters in a row hammer control circuit may be added. The adjustment circuit may reset each counter when each of the first count values of all counters reaches a target threshold, and adjust each first count value by a same offset value to obtain a second count value. A magnitude relationship between all second count values may be the same as a magnitude relationship between all first count values. Therefore, target memory rows determined according to a plurality of second count values may be the same as target memory rows determined according to a plurality of first count values. As can be seen, the adjustment circuit may not affect determining of target memory rows by the row hammer control circuit, but instead, may increase a remaining counting space of the counters after an adjustment. As such, a problem that the counters may be stuck because count values of counters are all in a high-level state can be avoided. In addition, in the present disclosure, significant bits of the counters do not need to be added. In other words, the number of flip-flops in the counters does not need to be increased, so that an occupied area of the counters is reduced. This may facilitate the miniaturization of the memory, while at the same time reducing power consumption of the memory. Moreover, the addition of the adjustment circuit does not affect the row hammer control circuit itself, other circuits in the memory, and circuits such as a memory controller. Therefore, the improvements provided by the present disclosure have a desirable validation cycle duration and reduced cost.

BRIEF DESCRIPTION OF THE DRAWINGS

FIG. 4b is a schematic diagram of a counting circuit provided by examples of the present disclosure.

FIG. 5 is a schematic operation diagram of a counting circuit provided by examples of the present disclosure.

FIGS. 6a and 6b are another schematic operation diagrams of a counting circuit provided by examples of the present disclosure.

FIG. 10 is a schematic diagram of a row hammer control circuit and an adjustment circuit provided by examples of the present disclosure.

FIG. 11 is a schematic table before and after count values of a plurality of counters are adjusted by the adjustment circuit as shown in FIG. 10.

FIG. 12 is a schematic bar chart before and after count values of a plurality of counters are adjusted by the adjustment circuit as shown in FIG. 10.

FIG. 13 is a schematic diagram of another row hammer control circuit and another adjustment circuit provided by examples of the present disclosure.

FIG. 14 is a schematic table before and after count values of a plurality of counters are adjusted by the adjustment circuit as shown in FIG. 13.

FIG. 15 is a schematic bar chart before and after count values of a plurality of counters are adjusted by the adjustment circuit as shown in FIG. 13.

FIG. 16 is a schematic diagram of a row hammer control circuit and an adjustment circuit provided by examples of the present disclosure.

FIG. 17 is a schematic table before and after count values of a plurality of counters are adjusted by the adjustment circuit as shown in FIG. 16.

FIG. 18 is a schematic bar chart before and after count values of a plurality of counters are adjusted by the adjustment circuit as shown in FIG. 16.

FIG. 19 is a schematic diagram of a row hammer control circuit and an adjustment circuit provided by examples of the present disclosure.

FIG. 20 is a schematic table before and after count values of a plurality of counters are adjusted by the adjustment circuit as shown in FIG. 19.

FIG. 21 is a schematic bar chart before and after count values of a plurality of counters are adjusted by the adjustment circuit as shown in FIG. 19.

DETAILED DESCRIPTION

Figure 1A:
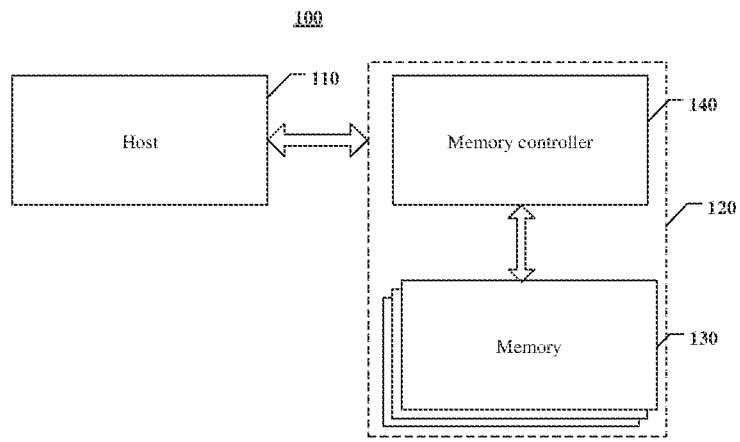
FIG. 1a is a block diagram of an example system having a memory provided by examples of the present disclosure.

The technical solution of the present disclosure is further set forth below in detail in conjunction with the appended drawings and examples. In the description of the present disclosure, it is to be understood that orientation or position relationships indicated by terms "length", "width", "depth", "upper", "lower", and "outer" are based on orientation or position relationships shown in the drawings, and are only intended to facilitate description of the present disclosure and to simplify the description, instead of indicating or implying that the device or element indicated must have a specific orientation and be configured and operated in a specific orientation, and thus cannot be understood as limiting the present disclosure.

Figure 1B:
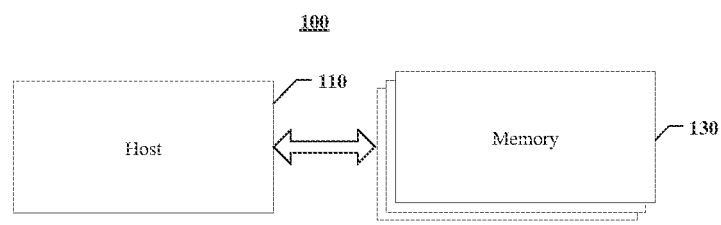
FIG. 1b is a block diagram of another example system having a memory provided by examples of the present disclosure.

FIGS. 1a and 1b are block diagrams of an example system having a memory provided by examples of the present disclosure. The system 100 may be a mobile phone, a desktop computer, a laptop computer, a tablet computer, a vehicle computer, a game console, a printer, a positioning device, a wearable electronic device, a smart sensor, a Virtual Reality (VR) device, an Augmented Reality (AR) device or any other suitable electronic devices having memories therein. As shown in FIG. 1a, the system 100 may comprise a host 110 and a memory system 120. The memory system 120 has one or more memories 130 and a memory controller 140. The host 110 may be a processor (e.g., a Central Processing Unit (CPU) or a System on a Chip (SoC), for example, an Application Processor (AP)) of an electronic device. The host 110 may be configured to send or receive data to or from the memory system 120.

In some examples, the memory controller 140 is coupled to the memory 130 and the host 110, and is configured to control the memory 130. The memory controller 140 may operate the memory 130 by providing a combination of various control signals and address signals. For example, the memory controller 140 may control the memory 130 to perform read and write operations. The memory controller 140 may further control the memory 130 to perform a refresh operation. The memory 130 may include all types of memories that perform the refresh operation to keep data stored in memory cells. For example, the memory 130 may include a Dynamic Random Access Memory (DRAM). The DRAM includes, but is not limited to, a Double Data Rate Synchronous Dynamic Random Access Memory (DDR SDRAM) (also referred to simply as "DDR").

The memory 130 may include a memory cell array and a peripheral circuit coupled to the memory cell array. The memory cell array may include a DRAM memory cell array. Each DRAM memory cell may include one transistor and one capacitor. A gate of the transistor is connected with a word line, a source is connected with a bit line, and a drain is connected with the capacitor. The memory cell array includes a plurality of memory rows. The memory cells in each memory row are coupled to the same word line, and the word line is coupled to a row decoder. A column decoder is coupled to a plurality of memory columns through a plurality of bit lines respectively.

The peripheral circuit may be coupled to the memory cell array through the word lines and the bit lines. The peripheral circuit can control on or off of the transistors by controlling word line voltages, so as to read data information stored in the capacitors or write data information to the capacitors through the bit lines.

In some examples, the memory controller 140 may provide an activation command ACT, a read command RD, and a write command WT to access the memory 130. The activation command ACT is a row access command. The memory controller 140 sends the activation command ACT and a row address signal simultaneously. The memory 130 receives the activation command ACT and the row address signal synchronously, and enables the word lines of the memory cell array according to the row address signal.

The memory controller 140 may further provide the read command RD to control the memory 130 to perform a read operation, or provide the write command WT to control the memory 130 to perform a write operation. Column address signal and the read command/the write command are sent simultaneously.

In an example, the memory 130 may receive the read command RD and the column address signal synchronously, and select the bit line of the memory cell array according to the column address signal, so as to perform a read operation on data in the memory cell at an intersection of the enabled word line and the selected bit line.

In an example, the memory 130 may receive the write command WT and the column address signal synchronously, and select the bit line of the memory cell array according to the column address signal. The memory 130 may receive, during a write operation, data sent by the memory controller 140, and may store the received data in the memory cell at an intersection of the enabled word line and the selected bit line.

In some examples, the memory controller 140 may provide a refresh command REF to control the memory 130 to perform a refresh operation. In an example, the memory controller 140 provides the refresh command REF to the memory 130 according to a fixed cycle. One refresh command REF is only valid for one memory row. The memory 130 may sequentially perform a refresh operation on all the memory rows according to the refresh command REF. In some examples, when performing refresh, the memory 130 does not require row address information provided from outside. Row addresses may be automatically and sequentially generated inside the memory.

In some examples, as shown in FIG. 1b, the memory 130 may be also directly coupled to the host 110, and performs various operations under the control of the host 110. For example, the host 110 may provide, in place of the above memory controller, a combination of various control signals and address signals to operate the memory 130. For example, the host provides the activation command ACT and the row address information to activate the memory row of the memory, provides the read command RD and the column address signal to perform a read operation, provides the write command WT and the column address signal to perform a write operation, and provides the refresh command REF to perform a refresh operation.

Figure 2:
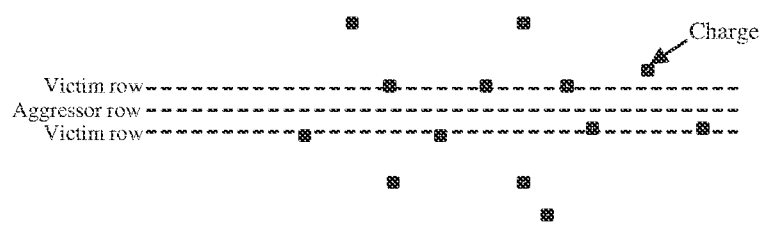
FIG. 2 is a schematic diagram of a row hammer effect.

In the DRAM, if a memory row is repeatedly accessed during a refresh window, charge leakage in memory cells in a memory row that is physically adjacent to the memory row will occur. This is a row hammer effect. FIG. 2 is a schematic diagram of a row hammer effect. As shown in FIG. 2, the repeatedly accessed memory row is referred to as an aggressor row. Memory rows (e.g., an upper memory row and a lower memory row physically adjacent to the aggressor row in FIG. 2) physically adjacent to the aggressor row are referred to as victim rows. Because the aggressor row is repeatedly accessed, a charge loss problem occurs in the victim rows. If a number of accesses of the aggressor row reaches a particular number, the row hammer effect may cause damage to data in the victim rows.

A method for resolving the row hammer effect is a target-row refresh (TRR). The target-row refresh is to find out the aggressor row and refresh one or more victim rows of the aggressor row. The data in the memory cells of the victim row is kept by means of refreshing the victim row.

In some examples, the memory may track the row address signal that is sent by the memory controller and that is synchronous with the activation command to obtain a number of accesses of each memory row. As such, a memory row with the largest number of accesses within a period of time may be determined. This row with the largest number of accesses is the aggressor row (e.g., a target memory row). The memory may refresh the victim row of the aggressor row to mitigate an adverse impact of the row hammer effect.

Figure 3:
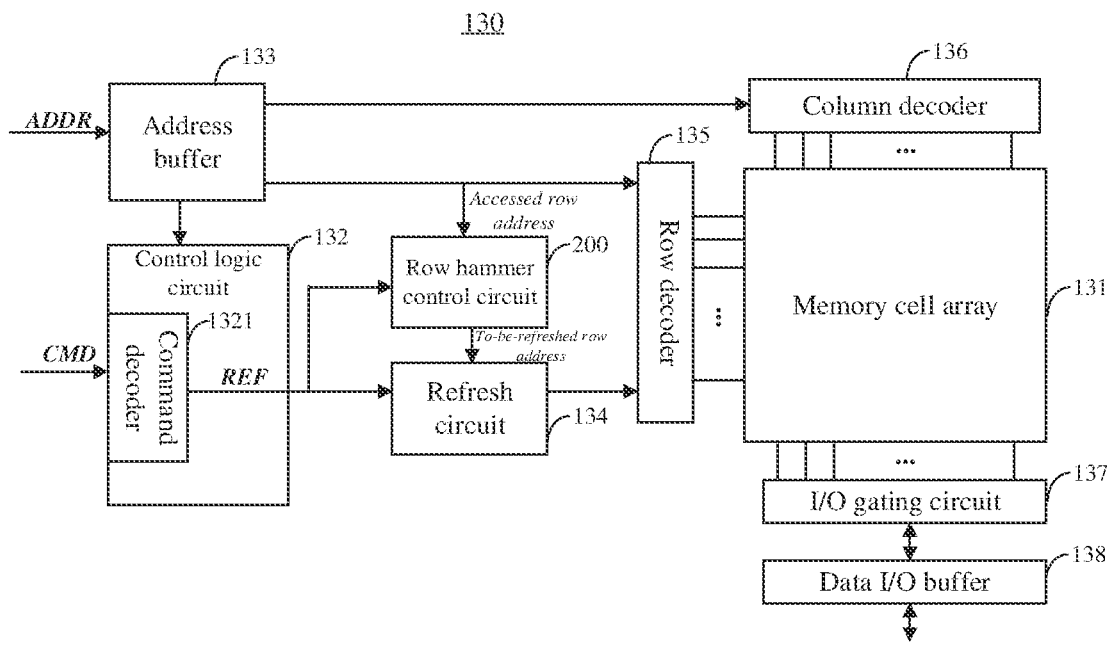
FIG. 3 is a schematic diagram of a memory provided by examples of the present disclosure.

FIG. 3 is a schematic diagram of a memory provided by examples of the present disclosure. FIG. 3 shows one example of the memory in FIGS. 1a and 1b. As shown in FIG. 3, the memory may include a memory cell array 131 and a peripheral circuit. The peripheral circuit may include a control logic circuit 132, an address buffer 133, a refresh circuit 134, a row decoder 135, a column decoder 136, an I/O gating circuit 137, a data I/O buffer 138, and a row hammer control circuit 200, etc.

The address buffer 133 may receive the row address signal, the column address signal, and the like from the memory controller 140 or the host 110. The address buffer 133 may provide the received column address signal to the column decoder 136, and provide the received row address signal to the row decoder 135 and the row hammer control circuit 200. The receiving of the row address signal by the address buffer 133 and the receiving of the activation command ACT by the control logic circuit 132 are synchronous.

The control logic circuit 132 may receive various commands CMD from the memory controller 140 or the host 110 and generate various control signals for controlling operations of the memory 130. In an example, a command decoder 1321 in the control logic circuit 132 is configured to receive various commands CMD and generate various control signals. The control logic circuit 132 may read data from or write data into the memory cell array 131 or perform another operation by using the control signals. For example, the control logic circuit 132 may receive the activation command ACT, to control the row decoder 135 to activate a memory row indicated by the row address signal. The control logic circuit 132 may receive the refresh command REF, to control the refresh circuit 134 to perform a refresh operation on a memory row. Although the control logic circuit 132 and the address buffer 133 in FIG. 3 are shown as separate components, the control logic circuit 132 and the address buffer 133 may be an integral component. Although the activation command ACT and the row address signal in FIG. 3 are shown as separate signals, it may be considered that the row address signal is included in the activation command ACT. Similarly, it may be considered that the column address signal is included in the read command RD or the write command WT.

The row decoder 135 may decode the row address signal received from the address buffer 133 to select, from a plurality of word lines WL, a word line WL corresponding to an accessed row address, and may connect the selected word line WL with a word line driver. The column decoder 136 may select a specific bit line BL from a plurality of bit lines BL connected with the memory cell array 131. The column decoder 136 may select one bit line, or may select a plurality of bit lines BL in a burst mode.

The data I/O buffer 138 may receive data from the host 110 or the memory controller 140 or transmit data to the host 110 or the memory controller 140. The I/O gating circuit 137 is connected with the data I/O buffer 138. The I/O gating circuit 137 may receive data from the data I/O buffer 138 and write the data into the memory cell array 131, or read data from the memory cell array 131 and transmit the data to the data I/O buffer 138.

The row hammer control circuit 200 may monitor numbers of accesses of memory rows, and detect a row address of a target memory row that is frequently accessed during a refresh window. For example, the row hammer control circuit 200 is connected with the address buffer 133 and the refresh circuit 134. The row hammer control circuit 200 is configured to receive accessed row addresses provided by the address buffer 133, count a number of accesses of each memory row, determine a memory row with the largest number of accesses as a target memory row, determine a to-be-refreshed row address of a victim row based on the target memory row, and provide the to-be-refreshed row address to the refresh circuit 134.

The refresh circuit 134 may perform a refresh operation on the to-be-refreshed row address in response to the to-be-refreshed row address provided by the refresh command REF and the row hammer control circuit 200, to keep data in memory cells in the victim row (in other words, an adjacent memory row of the target memory row), to mitigate the adverse impact of a row hammer effect.

Figure 4A:
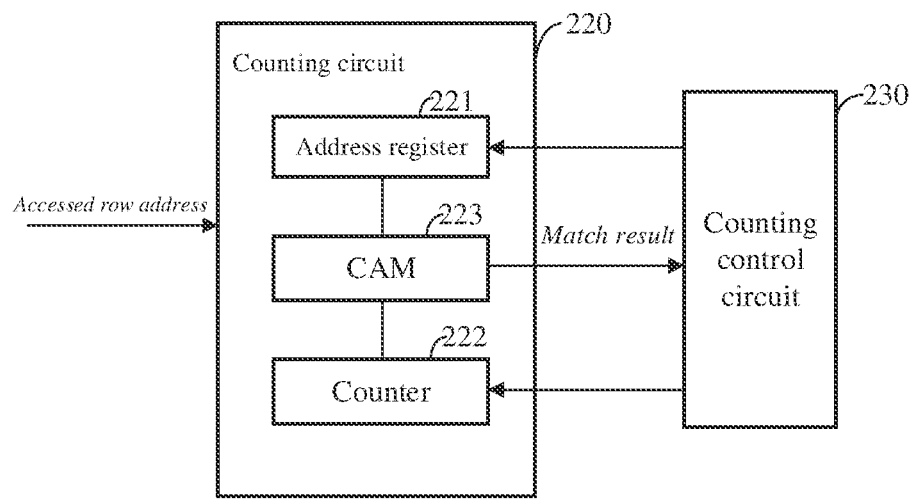
FIG. 4a is a schematic diagram of a row hammer control circuit provided by examples of the present disclosure.

FIG. 4a is a schematic diagram of a row hammer control circuit provided by examples of the present disclosure. FIG. 4b is a schematic diagram of a counting circuit provided by examples of the present disclosure. As shown in FIGS. 4a and 4b, the row hammer control circuit 200 includes a counting circuit 220 and a counting control circuit 230.

The counting circuit 220 is connected with the address buffer 133. The counting circuit 220 includes a plurality of address registers 221 and a plurality of counters 222. Each address register 221 is correspondingly connected with one counter 222. Each address register 221 may be configured to store one row address. The counter 222 is configured to count a number of accesses of the row address in the address register 221 connected therewith.

In some examples, after receiving an accessed row address, the counting circuit 220 may store the accessed row address in a vacant address register 221, and set a count value of the counter 222 corresponding to the address register 221 to 1.

In some examples, a number of the address registers 221 is less than a number of memory rows in the memory cell array 131. In a case that all the address registers 221 have stored a row address, after receiving an accessed row address, the counting circuit 220 matches the accessed row address against the row addresses stored in all the address registers 221, to obtain a matching result.

The counting control circuit 230 is connected with the counting circuit 220. When the matching result is that the accessed row address is the same as the row address stored in a first address register 221, the counting control circuit 230 is configured to increase a count value of the counter 222 corresponding to the first address register 221 by 1. When the matching result is that the accessed row address is the same as none of the row addresses stored in all the address registers 221, the counting control circuit 230 is configured to replace the row address in the second address register 221 with the accessed row address, and increase a count value of the counter 222 corresponding to the second address register 221 by 1. The second address register 221 is an address register 221 occupied by a row address with the smallest number of accesses.

The first address register and the second address register are named only for ease of description here. The first address register or the second address register does not, in particular, refer to an address register at a physical location in the counting circuit. Instead, the first address register or the second address register may be any address register in the counting circuit. In some cases, the first address register and the second address register may be the same address register.

In some examples, when the matching result is that the accessed row address is the same as the row address stored in the first address register 221, the counting circuit 220 may not send the matching result to the counting control circuit 230. Instead, the counting circuit 220 itself may increase the count value of the counter 222 corresponding to the first address register 221 by 1.

In some examples, when the matching result is that the accessed row address is the same as none of the row addresses stored in all the address registers 221, the counting control circuit 230 is further configured to indicate (e.g., choose) the second address register 221 corresponding to the row address with the smallest number of accesses.

In some examples, the counting circuit 220 further includes a plurality of content-addressable memories (CAM) 223. Each content-addressable memory 223 is connected with one address register 221 and the counter 222 corresponding to the address register 221. The content-addressable memory 223 is configured to receive an accessed address, and match the accessed address against row addresses stored in the address register 221 corresponding to the accessed address, to obtain a matching result, and transmit the matching result to the counting control circuit 230. The counting control circuit 230 may be connected with a plurality of address registers 221, a plurality of content-addressable memory 223, and a plurality of counters 222.

FIG. 5 is a schematic operation diagram of a counting circuit provided by examples of the present disclosure. FIG. 5 sequentially shows, from left to right, row addresses stored in address registers and the current states of count values of counters, states after a first activation command ACT1 is received, states after a second activation command ACT2 is received, and states after a row hammer refresh command is executed. As shown in FIG. 5, the counting circuit includes four address registers and four counters. For the four address registers and the four counters, in the current state, stored row addresses and numbers of accesses are as follows: an address 0XA0 has 0XA9 accesses, an address 0XB0 has 0X80 accesses, an address 0XC0 has 0XB1 accesses, and an address 0XD0 has 0XCA accesses.

Referring to FIG. 5, after the counting circuit receives the accessed row address 0XA0 that is synchronous with the first activation command ACT1, it is determined through matching that the address 0XA0 has been stored in an address register. Therefore, a number of accesses of the address 0XA0 stored in the counting circuit is increased by 1. As such, the number of accesses is increased from 0XA9 to 0XAA.

With continued reference to FIG. 5, after the counting circuit receives the accessed row address 0XE0 that is synchronous with the second activation command ACT2, it is determined through matching that the accessed address 0XE0 matches none of all row addresses that are currently stored in the counting circuit, and all the address registers have been occupied. In this case, an address entry 0XB0 with the smallest number of accesses (0X80) may be expelled, while the accessed address 0XE0 is stored in the address register, and a count value of a counter corresponding to the address register is increased by 1. Therefore, the number of accesses corresponding to the accessed address 0XE0 is 0X81. The purpose of this is to prevent malicious attacks by hackers. If the count value of the counter corresponding to the address register is set to 1 once the accessed address 0XE0 is stored in the address register, a hacker may have a chance to maliciously attack data in a memory row. For example, to attack a designated memory row, a hacker may first frequently access the designated memory row to make the memory row have a large number of accesses, but not the largest number of accesses in all the address registers, then disguise the memory row as a memory row with the smallest number of accesses, and send another memory row address to replace a row address of the designated memory row. In this case, the number of accesses of the designated memory row turns into 0. If the designated memory row is accessed again, the number of accesses of the designated memory row starts to be counted from 0. As a result, it is difficult for the designated memory row to become a memory row with the largest number of accesses. Therefore, the designated memory row cannot be determined as a target memory row, and a refresh command cannot be performed on the designated memory row, leading to a data loss. To prevent malicious attacks by hackers, in the row hammer control circuit provided by the present disclosure, after an address entry in an address register is replaced, when the row address is accessed again, the number of accesses of the row address is not zero, making it possible for the row address to become a row with the largest number of accesses to execute a refresh command on the row address.

In some examples, the counting control circuit 230 is further configured to indicate a target row address with the largest number of accesses. The row hammer control circuit 200 is further configured to determine a to-be-refreshed row address according to the target row address, and provide the to-be-refreshed row address to the refresh circuit 134. A memory row corresponding to the target row address with the largest number of accesses is a target memory row. A memory row corresponding to the to-be-refreshed row address is an adjacent memory row of the target memory row.

The refresh circuit 134 is connected with the command decoder 1321. The refresh circuit 134 is configured to perform a refresh operation on the to-be-refreshed row address in response to the refresh command REF and the to-be-refreshed row address.

In this example, the row hammer control circuit 200 indicates a target row address with the largest number of accesses and determines a to-be-refreshed row address. The to-be-refreshed row address is a row address of an adjacent memory row of a target memory row. The refresh circuit 134 performs a refresh operation on the to-be-refreshed row address in response to the refresh command REF and the to-be-refreshed row address. In this way, the impact of a row hammer effect on the adjacent memory row (e.g., a victim row) of the target memory row can be reduced, to avoid a data loss of the victim row.

In some examples, the row hammer control circuit 200 is configured to increase the target row address by 1 and/or decrease the target row address by 1 (+1 and/or −1), to generate a to-be-refreshed row address, e.g., a row address of an adjacent memory row of the target memory row. In some examples, an operation of determining the to-be-refreshed row address from the target row address may be performed by the counting control circuit 230, or may be implemented by another circuit in the row hammer control circuit. For example, the row hammer control circuit 200 may further include an address generation circuit. The address generation circuit is connected with the counting control circuit 230. The address generation circuit is configured to acquire a target row address, determine a to-be-refreshed row address, and transmit the to-be-refreshed row address to the refresh circuit 134.

The memory controller may only provide the refresh command REF to the memory, but does not distinguish whether the refresh command provided to the memory is a row hammer refresh command RH REF. According to the received refresh command REF, the row hammer control circuit 200 inside the memory 130 provides row address information of an adjacent memory row of the target memory row once every period of time, for the refresh circuit 134 to perform a refresh operation on the adjacent memory row of the target memory row. The refresh operation may be considered as one row hammer refresh command RH REF.

For other refresh commands REF that are not used as the row hammer refresh command RH REF, the memory controls (e.g., according to these refresh commands REF) the refresh circuit 134 to perform common refresh operations. For example, the memory performs refresh operations on a memory row in a particular order.

In some examples, the row hammer control circuit 200 periodically selects a refresh command REF as a row hammer refresh command RH REF. It may be understood that the row hammer control circuit 200 selects one refresh command REF as a row hammer refresh command RH REF after every preset number of refresh commands REF. For example, the row hammer control circuit 200 is configured to select one refresh command REF as a row hammer refresh command RH REF after every seven refresh commands REF. In other words, eight refresh commands REF are used as one cycle. The row hammer control circuit 200 is configured to select the last refresh command REF in the cycle as the row hammer refresh command RH REF.

For example, the row hammer control circuit 200 may include a command counter, configured to count refresh commands REF, and when a count value is a maximum count value of the command counter, select a refresh command REF corresponding to the count value as a row hammer refresh command RH REF. In the foregoing example in which one refresh command REF is selected as a row hammer refresh command RH REF after every seven refresh commands REF, the maximum count value of the command counter may be 7, and the count value of the command counter is reset to 0 after the maximum value is reached. The row hammer control circuit 200 is configured to determine, when the count value of the command counter is 7, that the refresh command REF corresponding to the count value is the row hammer refresh command RH REF.

In some examples, the counting control circuit 230 is further configured to reset, when or after the refresh circuit 134 performs a refresh operation, a number of accesses of a row address with the largest number of accesses to the smallest number of accesses in all row addresses.

As shown in FIG. 5, the counting control circuit 230 indicates an address 0XD0 having the largest number of accesses (0XCA), and resets, after the refresh circuit 134 performs a refresh operation, a number of accesses of the address 0XD0 to the smallest number of accesses in all the row addresses. The smallest number of accesses in the four row addresses is 0X81, and therefore a number of accesses of the address 0XD0 is reset to 0X81.

It may be understood that after a refresh operation is performed on the adjacent memory row of the target memory row, a number of accesses corresponding to the target memory row is reset to the smallest number of accesses, to avoid the case that one memory row is repeatedly designated as a target memory row, making it difficult or impossible to refresh an adjacent memory row of another memory row with a large number of accesses, leading to the adverse impact of a row hammer effect.

As discussed above, in the present disclosure, the counting circuit 220 performs three operations. These three operations may include an increase operation, a replacement operation, and an additional refresh operation. The increase operation is to increase the count value of the counter corresponding to one of the address registers by 1 when the matching result is that the accessed row address is the same as a row address stored in the address register. The replacement operation is to replace, when the matching result is that the accessed row address is the same as none of the row addresses stored in all the address registers, a row address with the smallest number of accesses with the accessed row address, and increase the count value of the counter corresponding to the address register by 1. The additional refresh operation is to reset, when or after the refresh circuit 134 performs the row hammer refresh command RH REF, a number of accesses of a row address with the largest number of accesses to the smallest number of accesses in all the row addresses.

Figure 6B:
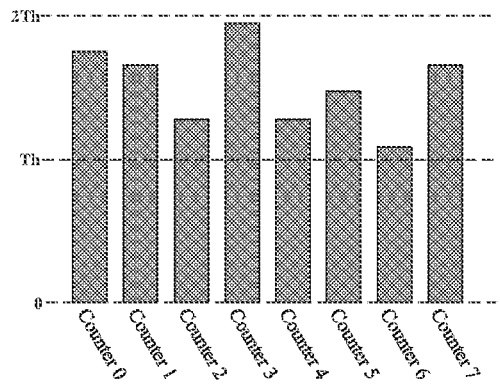

FIGS. 6a and 6b are another schematic operation diagram of a counting circuit provided by examples of the present disclosure. In FIG. 6a, current count values of a plurality of counters in the counting circuit are shown on the left side, and count values of the plurality of counters after the row hammer refresh command RH REF is executed are shown on the right side. FIG. 6b shows count values of the plurality of counters at a moment after the increase operation, the replacement operation, and the reset operation are performed multiple times.

As shown in FIG. 6a, the counting circuit includes eight address registers and eight counters. A row address in an address register corresponding to a counter 4 has the largest number of accesses. Therefore, the row address in the address register corresponding to the counter 4 is a row address of a target memory row. After the row hammer refresh command RH REF is executed, the counting circuit performs an additional refresh operation, to reset a count value of the counter 4 to the smallest value in all count values. Therefore, count values of the counter 4 and a counter 2 are both the smallest value.

With continued reference to FIGS. 6a and 6b, the additional refresh operation resets the maximum count value to a minimum count value, so that count values of different counters have reduced differences. In addition, as activation commands ACT keep increasing, the minimum count value also keeps increasing, and count values of all counters are in a high-value state. A plurality of counters may eventually become stuck. A method for alleviating this problem is to increase significant bits of each counter, to increase the maximum count value of the counter. However, a large area may be occupied, which is adverse to the miniaturization of the memory, and causes an increase in the power consumption of the memory.

Figure 7:
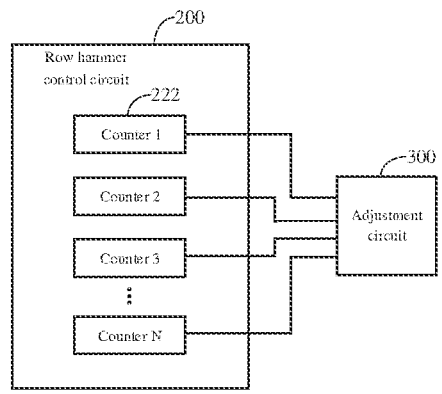
FIG. 7 is a schematic diagram of a memory provided by examples of the present disclosure.

FIG. 7 is a schematic diagram of another memory provided by examples of the present disclosure. In some examples, as shown in FIG. 7, the memory may include a row hammer control circuit 200, which includes a plurality of counters 222. Each counter 222 may be configured to: count a number of accesses of a memory row, and generate a first count value. The memory may include an adjustment circuit 300, connected with the plurality of counters 222. The adjustment circuit 300 may be configured to reset each counter 222 when each of a plurality of first count values reaches a target threshold, and adjust each first count value by the same offset value, to generate a plurality of second count values. The row hammer control circuit 200 may be further configured to determine a target memory row according to the plurality of second count values.

In some examples, the target threshold may be a specific value, e.g., 128. When each of the plurality of first count values reaches the target threshold, this means that every first count value is greater than or equal to the target threshold. In some other examples, the target threshold may be a range, e.g., 160 to 191. When each of the plurality of first count values reaches the target threshold, this means that every first count value is within the range indicated by the target threshold.

In the present disclosure, the row hammer control circuit 200 is configured to reduce the impact of a row hammer effect on the adjacent memory row of the target memory row. The row hammer control circuit 200 counts, by using the plurality of counters 222, a number of accesses of each accessed memory row, to generate a first count value. Each memory row in the memory cell array may be an accessed memory row.

The present disclosure does not limit the specific implementation of counting numbers of accesses of memory rows by the row hammer control circuit 200 using the plurality of counters 222. In some examples, the row hammer control circuit 200 may include entries and counters of the same quantities as the memory rows in the memory cell array, to count the number of accesses of each memory row in the memory cell array. In some other examples, to avoid malicious attacks of hackers, the numbers of accesses of the memory rows may be counted by using the counting circuit 220 in the row hammer control circuit 200 shown in any foregoing example of the present disclosure. That is, the plurality of counters 222 shown in FIG. 7 may be the plurality of counters 222 in the counting circuit 220 in any foregoing example of the present disclosure.

In the foregoing of the present disclosure, the row hammer control circuit 200 determines a target memory row according to the first count values of the plurality of counters 222. For example, the row hammer control circuit 200 chooses a memory row corresponding to the largest first count value in all the first count values as the target memory row.

As shown in FIG. 6b, as the activation command keeps increasing, the first count values of the counters keep increasing, such that the first count values of all the counters are in a high-value state. As a result, the plurality of counters may become stuck. In this example, the adjustment circuit 300 connected with all the counters 222 is disposed. The adjustment circuit 300 is configured to reset each counter 222 when each of the first count values reaches the target threshold, and adjust each first count value by the same offset value, to generate a plurality of second count values. The row hammer control circuit 200 determines a target memory row according to the plurality of second count values.

The target threshold may be set according to an actual requirement. The present disclosure does not limit the specific value of the target threshold. For example, the target threshold may be equal to half of a counting capacity of a counter. By way of example and not limitation, a counting capacity of an 8-bit binary counter is 256. In this case, the target threshold may be 128. For example, the target threshold may be equal to three fourths of a counting capacity of a counter. For example, for an 8-bit binary counter, the target threshold may be 192. In another example, the target threshold may be greater than or equal to three eighths of a counting capacity and less than seven eighths of the counting capacity. For example, for an 8-bit binary counter, the target threshold may be 160 to 191.

Figure 8:
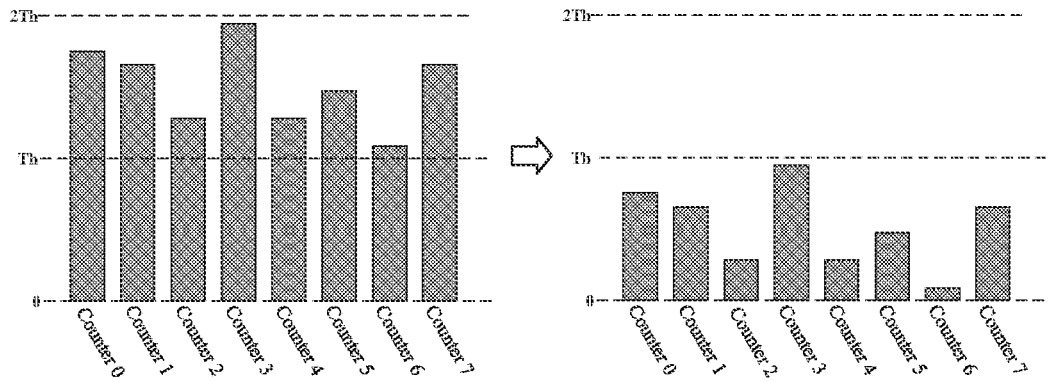
FIG. 8 is a schematic diagram before and after count values of a plurality of counters as shown in FIG. 6b are adjusted by an adjustment circuit provided by examples of the present disclosure.

FIG. 8 is a schematic diagram before and after first count values of a plurality of counters shown in FIG. 6b are adjusted by an adjustment circuit provided by examples of the present disclosure. In an example, in FIG. 8, the target threshold is equal to half of a counting capacity of a counter. As shown in FIG. 8, when a first count value of each counter reaches the target threshold, the adjustment circuit resets each counter, and reduces each first count value by the same offset value. The reduced first count value is the updated to the second count value.

The adjustment circuit 300 reduces all the first count values by the same offset value. This is equivalent to folding bar charts of all first count values toward the target threshold to hide a segment of each bar chart. As shown in FIG. 8, after the folding, an original magnitude order is kept for all the second count values. In other words, a magnitude relationship between all second count values is the same as a magnitude relationship between all first count values. Therefore, a memory row corresponding to the largest second count value is selected from all the second count values as a target memory row, which is the same as a target memory row determined by selecting a memory row corresponding to the largest first count value from all the first count values. That is, the target memory row determined according to the plurality of second count value is the same as the target memory row determined according to the plurality of first count values. This means that in the adjustment circuit provided in this example, first count values of all counter can be adjusted by the same offset value. Not only the determining of the target memory row by the row hammer control circuit is not affected, but also remaining counting space of the counters can be increased after the adjustment. This is equivalent to a counter with an infinite counting capacity. Even if activation commands continue increasing, a probability that the counters are stuck is greatly reduced, and the counters will generally not be stuck. In addition, in the adjustment circuit in this example, significant bits of the counters do not need to be added. In other words, a number of flip-flops in the counters does not need to be increased, so that an occupied area of the counters is reduced, which facilitates the miniaturization of the memory and can reduce power consumption of the memory.

It should be understood that the adjustment circuit 300 provided in this example may be used in the row hammer control circuit 200, and may be used in another circuit including a plurality of counters, to increase the remaining counting space of the counters without increasing significant bits of the counters.

It should further be understood that the adjustment circuit 300 provided in this example can be configured to increase a remaining counting space of an up counter, and may be configured to increase a remaining counting space of a down counter.

In some examples, when at least one first count value is less than the target threshold, the adjustment circuit does not perform an operation. In this way, the impact of the adjustment circuit on the row hammer control circuit is reduced.

In some examples, each counter 222 includes a plurality of flip-flops. Each flip-flop corresponds to one significant bit of the first count value. Levels of output terminals of the flip-flops indicate values of the significant bits.

When values of preset significant bits of the significant bits of the plurality of first count values are the same, the adjustment circuit is configured to reset levels of output terminals of flip-flops corresponding to the preset significant bits, to set values of the preset significant bits to preset values. The first count values for which the preset significant bits are reset are updated to the second count values.

Figure 9:
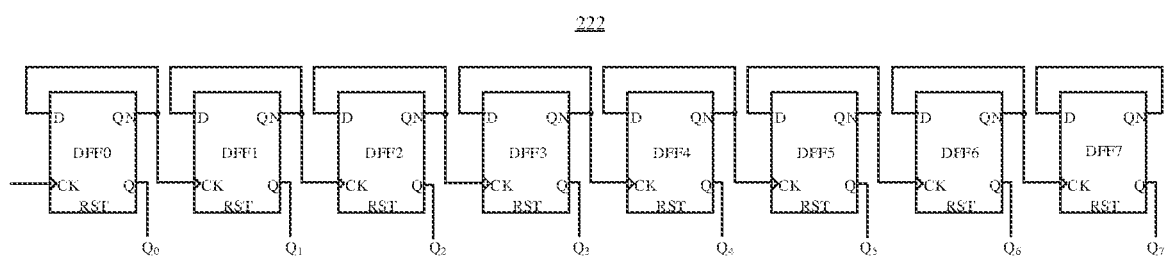
FIG. 9 is a schematic diagram of a counter provided by examples of the present disclosure.

FIG. 9 is a schematic diagram of a counter provided by examples of the present disclosure. The counter 222 is an asynchronous up counter. As shown in FIG. 9, the counter 222 includes eight flip-flops, e.g., DFF0, DFF1, DFF2, DFF3, DFF4, DFF5, DFF6, and DFF7. The eight flip-flops form one 8-bit binary counter. Output terminals of the flip-flops DFF0, DFF1, DFF2, DFF3, DFF4, DFF5, DFF6, and DFF7 respectively correspond to significant bits $Q_0$, $Q_1$, $Q_2$, $Q_3$, $Q_4$, $Q_5$, $Q_6$, and $Q_7$ of a count value. $Q_7$ is the most significant bit of the count value, and $Q_0$ is the least significant bit of the count value. The count value of the binary counter 222 may be represented as $Q_7Q_6Q_5Q_4Q_3Q_2Q_1Q_0$, for example, 10001111.

A level of an output terminal of a flip-flop is used for indicating a value of a significant bit. The output terminal of the flip-flop may have a high level or a low level. In this example and the following examples of the present disclosure, the high level of the output terminal of the flip-flop is used for indicating that the value of the corresponding significant bit is 1, and the low level of the output terminal of the flip-flop is used for indicating that the value of the corresponding significant bit is 0. In some other examples, the high level of the output terminal of the flip-flop may be used for indicating that the value of the corresponding significant bit is 0, and the low level of the output terminal of the flip-flop is used for indicating that the value of the corresponding significant bit is 1.

An initial value of each significant bit may be 0 or may be 1. This is not limited in the present disclosure. In the following examples of the present disclosure, the technical solution of the present disclosure is described by using an example in which the initial value of the significant bit is 0.

A preset significant bit is designated from a plurality of significant bits of a count value. The preset significant bit may include one or more significant bits. However, a number of significant bits in the preset significant bit is less than a total number of significant bits in the first count value. The preset significant bit may include one or more of the most significant bit, the second most significant bit, the third most significant bit, and the like in the plurality of significant bits. The number of significant bits included in the preset significant bit and locations of the included significant bits depend on requirements for the target threshold.

In some examples, the preset significant bit may be the most significant bit in the plurality of significant bits of the first count value.

In some other examples, the preset significant bits may include a plurality of significant bits sequentially set from most significant bits to low significant bits of the first count values, and a number of significant bits in the preset significant bits is less than a number of significant bits of the first count values. For example, the preset significant bit may include the most significant bit and the second most significant bit. In another example, the preset significant bit may include the most significant bit, the second most significant bit, and the third most significant bit.

In some examples, when the preset significant bit includes a plurality of significant bits, the so-called "values of preset significant bits in the significant bits of the plurality of first count values are the same" means that in the preset significant bits of all the first count values, the values of significant bits at the same location are correspondingly equal. For example, the preset significant bit includes the most significant bit and the second most significant bit, the so-called "values of preset significant bits in the significant bits of the plurality of first count values are the same" means that the most significant bits of all the first count values are the same, and the second most significant bits of all the first count values are also the same. The most significant bit and the second most significant bit may be the same or may be different. In other words, when the values of the preset significant bits of the plurality of first count values are the same, the values of the plurality of significant bits in the preset significant bit may be different. For example, the value of the most significant bit may be 1, and the value of the second most significant bit may be 0.

It may be understood that the target threshold should be greater than the initial value. Therefore, when the values of the preset significant bits of the plurality of first count values are the same, the value of the preset significant bit should further be different from an initial value of the preset significant bit. The so-called initial value of the preset significant bit refers to that a value of each significant bit in the preset significant bit is the initial value.

"The value of the preset significant bit is different from an initial value of the preset significant bit" may be that a value of at least one significant bit in the plurality of significant bits of the preset significant bit is different from the initial value. The values of the plurality of significant bits of the preset significant bit may all be different from the initial value.

The adjustment circuit sets the value of the preset significant bit to the preset value, so that each first count value is adjusted by the same offset value. The preset value is less than the target threshold. When the target threshold indicates a range, the preset value is less than a minimum value within the range. For example, the offset value is equal to a difference between the target threshold and the preset value.

In some examples, the preset value is the initial value of the preset significant bit. The initial value is the smallest preset value. In this case, the offset value is equal to the target threshold.

In some examples, the adjustment circuit may include an adjustment unit. A plurality of input terminals of the adjustment unit are connected with the output terminals of the flip-flops corresponding to the preset significant bits in the plurality of counters, and an output terminal of the adjustment unit is connected with reset terminals or set terminals of the flip-flops corresponding to the preset significant bits in the plurality of counters. When the values of the preset significant bits of the plurality of first count values are the same, the adjustment unit is configured to send a control signal to reset terminals or set terminals of flip-flops corresponding to the preset significant bits, to set the values of the preset significant bits to the preset values.

In some examples, the reset terminal of the flip-flop is configured to set the output terminal of the flip-flop to an initial level, for example, a low level, representing "0". The set terminal of the flip-flop is configured to set the output terminal of the flip-flop to a non-initial level, for example, a high level, representing "1".

In some examples, the preset values include "1" and "0". Therefore, the adjustment circuit may send a control signal to the reset terminals or set terminals of the plurality of flip-flops corresponding to the preset significant bit, to set the values of the preset significant bits to the preset values.

In some examples, the preset values are the initial values of the preset significant bits. The adjustment unit is configured to send the control signal to the reset terminals of the flip-flops corresponding to the preset significant bits, to set the values of the preset significant bits to the initial values.

The plurality of input terminals of the adjustment circuit are connected with output terminals of preset flip-flops in the plurality of counters. An output terminal of the adjustment circuit is connected with reset terminals of the preset flip-flops in the plurality of counters.

In some examples, the adjustment unit may include an AND gate circuit. A plurality of input terminals of the AND gate circuit are respectively connected with the output terminals of the flip-flops corresponding to the preset significant bits in the plurality of counters, and an output terminal of the AND gate circuit is connected with the reset terminals of the flip-flops corresponding to the preset significant bits in the plurality of counters. When the levels of the output terminals of the flip-flops corresponding to the preset significant bits in the plurality of counters are the same and a level of an output terminal of a flip-flop corresponding to each significant bit in the preset significant bits is different from an initial level, the control signal is sent to the reset terminals of the flip-flops corresponding to the preset significant bits, to set the output terminals of the flip-flops corresponding to the preset significant bits to the initial level, and the initial level indicates the initial values of the significant bits.

In a case that the initial value is 0, "the levels of the output terminals of the flip-flops corresponding to the preset significant bits in the plurality of counters are the same and a level of an output terminal of a flip-flop corresponding to each significant bit in the preset significant bits is different from an initial level" indicates that a value of each significant bit in the preset significant bits of the plurality of first count values is 1.

FIG. 10 is a schematic diagram of a row hammer control circuit and an adjustment circuit provided by some examples of the present disclosure. FIGS. 11 and 12 are respectively a schematic table and a schematic bar chart before and after count values of a plurality of counters are adjusted by the adjustment circuit shown in FIG. 10. The counters in FIG. 10 may be the counters shown in FIG. 9. As shown in FIG. 10, the preset significant bit is the most significant bit of the first count value, and the most significant bit corresponds to a flip-flop DFF7, in this example. An initial value of the most significant bit is 0.

In this example, the adjustment circuit 300 includes an adjustment unit 310. The adjustment unit 310 includes an AND gate circuit 311. A plurality of input terminals of the AND gate circuit 311 are connected with output terminals of flip-flops DFF7 corresponding to all the most significant bits, and an output terminal of the AND gate circuit 311 is connected with reset terminals of all the flip-flops DFF7. The AND gate circuit 311 is configured to send a control signal to the reset terminals of the flip-flops DFF7 when the output terminals of all the flip-flops DFF7 are set to a high level (e.g., indicating that a value of the most significant bit is 1), so that the output terminals of all the flip-flops DFF7 are set to a low level (e.g., indicating that the value of the most significant bit is reset to 0).

FIG. 11 provides a description by using an example of four address registers and four counters. As shown in FIG. 11, for the four address registers and the four counters, in a current state, stored row addresses and numbers of accesses are as follows: a number of accesses of an address 0XA0 is 0X8F (10001111). Binary data corresponding to hexadecimal 0X8F is provided in the brackets. A number of accesses of an address 0XB0 is 0X7F (01111111), and a number of accesses of an address 0XC0 is 0X8A (10001010). A number of accesses of an address 0XD0 is 0X8B (10001011).

When the counting circuit receives the accessed address 0XB0 that is synchronous with a third activation command ACT3, the number of accesses of the address 0XB0 in the counting circuit is increased by 1. Therefore, the number of accesses is increased from 0X7F to 0X80 (10000000).

After the number of accesses of the address 0XB0 is changed to 0X80 (10000000), values of the most significant bits of all counters are changed from the initial value of 0 to 1. In this case, the adjustment circuit 300 resets the flip-flops DFF7 corresponding to the most significant bits, so that the values of the most significant bits of all the counters are changed to 0.

With continued reference to FIG. 11, before the flip-flops DFF7 are reset, a magnitude order of four first count values is: 0X8F>0X8B>0X8A>0X80. A row address of a target memory row determined by the largest count value in the four first count values is 0XA0.

After the flip-flop DFF7 is reset, the numbers of accesses of the address 0XA0, the address 0XB0, the address 0XC0, and the address 0XD0 are sequentially 0X0F (00001111), 0X00 (00000000), 0X0A (00001010), and 0X0B (00001011). A magnitude order of the four second count values is: 0X0F>0X0B>0X0A>0X00. The address 0XA0 is an address with the largest number of accesses. Therefore, a memory row corresponding to the address 0XA0 is a target memory row. As can be seen, after the counters are reset, a magnitude relationship of the count values of all the counters remains unchanged. Therefore, the determined target memory row remains unchanged.

FIG. 12 provides a description by using an example of eight address registers and eight counters. The eight address registers and the eight counters may include the four address registers and the four counters in FIG. 11. Each counter is an 8-bit binary counter, and has a counting capacity of decimal 256. The most significant bit of the first count value is 1, representing that the first count value is equal to or greater than 10000000. In this case, it may be understood that the target threshold is 10000000 (corresponding hexadecimal 0X80 and binary 128). The target threshold is half of the counting capacity of the counter.

The adjustment circuit 300 sets the most significant bit of each first count value to 0. This is equivalent to that each first count value is decreased by 10000000. As shown in FIG. 12, each first count value is decreased by 10000000. This is equivalent a bar chart of the first count value being folded toward a target threshold Th to hide a segment of the bar chart. The obtained magnitude relationship between a plurality of second count values and the magnitude relationship between a plurality of first count values remains unchanged. Therefore, the adjustment of the counters by the adjustment circuit does not affect determining of the target memory row.

In this example, a preset value of the most significant bit is an initial value. Therefore, the preset value is 0. An offset value and the target threshold are equal, and are both 10000000.

FIG. 13 is a schematic diagram of another row hammer control circuit and another adjustment circuit provided by examples of the present disclosure. FIGS. 14 and 15 are respectively a schematic table and a schematic bar chart before and after count values of a plurality of counters 222 are adjusted by the adjustment circuit 300 shown in FIG. 13. As shown in FIG. 13, in this example, the preset significant bit includes the most significant bit and the second most significant bit of the first count value, which respectively correspond to a flip-flop DFF7 and a flip-flop DFF6, in this example.

The adjustment unit 310 includes an AND gate circuit 312. A plurality of input terminals of the AND gate circuit 312 are respectively connected with flip-flops DFF7 corresponding to all the most significant bits and flip-flops DFF6 corresponding to all the second most significant bits, and an output terminal of the AND gate circuit 312 is connected with reset terminals of all preset flip-flops DFF7 and DFF6.

The AND gate circuit 312 is configured to send, when output terminals of all the preset flip-flops DFF7 and DFF6 are at a high level (e.g., indicating that values of the most significant bits and the second most significant bits are all 1), a control signal to reset terminals of each preset flip-flop DFF7 and each preset flip-flop DFF6, so that the output terminals of each preset flip-flop DFF7 and each preset flip-flop DFF6 are reset to a low level. This indicates that the values of the most significant bits and the second most significant bits are all 0, e.g., an initial value 00 of the preset significant bit, to obtain a plurality of second count values.

In some examples, the AND gate circuit 312 may include AND gates. In some other examples, the AND gate circuit 311 may include NAND gates and NOT gates that are connected in series. A circuit of the NAND gates is simpler than that of the AND gates, and occupies a smaller area. Therefore, the AND gate circuit 312 formed by the NAND gates and the NOT gates occupies a smaller layout area.

FIG. 14 provides a description by using an example of four address registers and four counters. As shown in FIG. 14, for the four address registers and the four counters, in a current state, stored row addresses and numbers of accesses are as follows: a number of accesses of an address 0XA0 is 0XDF (11011111), a number of accesses of an address 0XB0 is 0XCA (11001010), a number of accesses of an address 0XC0 is 0XBF (10111111), and a number of accesses of an address 0XD0 is 0XFB (11111011).

When the counting circuit receives the accessed address 0XC0 that is synchronous with a fourth activation command ACT4, the number of accesses of the address 0XC0 in the counting circuit is increased by 1. Therefore, the number of accesses is increased from 0XBF to 0XC0 (11000000).

After the number of accesses of the address 0XC0 is changed to 0XC0 (11000000), values of the most significant bits and the second most significant bits of all counters are changed from the initial value of 0 to 1. In this case, the adjustment circuit resets the flip-flops DFF7 and DFF6 corresponding to the most significant bits and the second most significant bits, so that the values of the most significant bits and the second most significant bits of all the counters are changed to 0.

As shown in FIG. 14, before the flip-flops DFF7 and DFF6 are reset, a magnitude order of four first count values is: 0XFB>0XDF>0XCA>0XC0. A row address of a target memory row determined by the largest count value in the four first count values is 0XD0.

After the flip-flops DFF7 and DFF6 are reset, the numbers of accesses of the address 0XA0, the address 0XB0, the address 0XC0, and the address 0XD0 are sequentially 0X1F (00011111), 0X0A (00001010), 0X00 (00000000), and 0X3B (00111011). A magnitude order of the four second count values is: 0X3B>0X1F>0X0A>0X00. The address 0XD0 is an address with the largest number of accesses. Therefore, a memory row corresponding to the address 0XD0 is a target memory row. As can be seen, after the counters are reset, a magnitude relationship of the count values of all the counters remains unchanged. Therefore, the determined target memory row remains unchanged.

FIG. 15 provides a description by using an example of eight address registers and eight counters. The eight address registers and the eight counters may include the four address registers and the four counters in FIG. 14. Each counter is an 8-bit binary counter, and has a counting capacity of decimal 256. The most significant bit and the second most significant bit of the first count value are 1, representing that the first count value is equal to or greater than 11000000. In this case, it may be understood that the target threshold is 11000000 (corresponding hexadecimal 0XC0 and decimal 192). The target threshold is three fourths of the counting capacity of the counter.

The adjustment circuit 300 resets the most significant bit and the second most significant bit of each first count value to 0. This is equivalent to each first count value being decreased by 11000000. As shown in FIG. 15, each first count value is decreased by 11000000. This is equivalent to a bar chart of the first count value being folded toward a target threshold Th to hide a segment of the bar chart. The obtained magnitude relationship between a plurality of second count values and the magnitude relationship between a plurality of first count values remain unchanged. Therefore, the adjustment of the counters by the adjustment circuit does not affect determining of the target memory row.

In this example, a preset value of the most significant bit is an initial value. Therefore, the preset value is 0. An offset value and the target threshold are equal, and are both 11000000.

In some examples, the preset significant bits include first-type significant bits and second-type significant bits, and the adjustment unit may include a plurality of NOT gate circuits. Input terminals of the plurality of NOT gate circuits are connected with output terminals of flip-flops corresponding to the first-type significant bits in the plurality of counters. The adjustment unit may include an AND gate circuit, which includes a plurality of first input terminals and a plurality of second input terminals. The first input terminals are connected with output terminals of the NOT gate circuits. The plurality of second input terminals are connected with output terminals of flip-flops corresponding to the second-type significant bits in the plurality of counters. An output terminal of the AND gate circuit is connected with reset terminals of the flip-flops corresponding to the second-type significant bits in the plurality of counters.

When levels of the output terminals of the flip-flops corresponding to the first-type significant bits in the plurality of counters are equal to an initial level and levels of the output terminals of the flip-flops corresponding to the second-type significant bits are the same and are different from the initial level, the adjustment unit is configured to send the control signal to the reset terminals of the flip-flops corresponding to the second-type significant bits, to set the levels of the output terminals of the flip-flops corresponding to the second-type significant bits to the initial level.

It should be understood that the output terminal of the AND gate circuit may further be connected with reset terminals of the flip-flops corresponding to the first-type significant bits, so that the output terminals of the flip-flops corresponding to the first-type significant bits also perform a reset operation. Although before and after the reset, the levels of the output terminals of the flip-flops are all at initial levels, a reset operation may be performed.

FIG. 16 is a schematic diagram of another row hammer control circuit and another adjustment circuit provided by examples of the present disclosure. FIGS. 17 and 18 are respectively a schematic table and a schematic bar chart before and after count values of a plurality of counters are adjusted by the adjustment circuit shown in FIG. 16. As shown in FIG. 16, the preset significant bit includes the most significant bit, the second most significant bit, and the third most significant bit of the first count value, which respectively correspond to a flip-flop DFF7, a flip-flop DFF6, and a flip-flop DFF5, in this example. The second most significant bit is a first-type significant bit, and the most significant bit and the third most significant bit are second-type significant bits.

The adjustment unit 310 includes a plurality of NOT gate circuits 314 and an AND gate circuit 313. An input terminal of each NOT gate circuit 314 is connected with an output terminal of a flip-flop DFF6 corresponding to the second most significant bit in one counter.

A plurality of first input terminals of the AND gate circuit 313 are connected with output terminals of the plurality of NOT gate circuits 314. A plurality of second input terminals of the AND gate circuit 313 are connected with flip-flops DFF7 corresponding to the most significant bits and flip-flops DFF5 corresponding to the third most significant bits in all counters.

The adjustment unit 310 is configured to send, when output terminals of all the flip-flops DFF6 are at a low level (e.g., indicating that values of the second most significant bits are 0) and output terminals of all the flip-flops DFF7 and DFF5 are at a high level (e.g., indicating that values of the most significant bits and the third most significant bits are all 1), a control signal to reset terminals of each preset flip-flop DFF7 and each preset flip-flop DFF5, so that output terminals of each preset flip-flop DFF7 and each preset flip-flop DFF5 are reset to a low level (e.g., indicating that the values of the most significant bits and the third most significant bits are all 0). In this way, the output terminals of all the flip-flops DFF7, DFF6, and DFF5 are at a low level, indicating that the value of the preset significant bit is an initial value of 000, to obtain a plurality of second count values.

In this example, a control signal applied to the reset terminals is a reset signal. The reset signal includes one effective pulse. The effective pulse has a high level. That is, the reset signal is valid at a high level. When the reset terminal of the flip-flop receives a high level, the flip-flop is reset to set the output terminal to a low-level state.

A logic of the AND gate circuit 313 is that when all the input terminals are simultaneously at a high level, an output terminal is set to a high level. Therefore, a level of the output terminal of the flip-flop DFF6 needs to be phase-inverted by the NOT gate circuits before being inputted into the AND gate circuit.

In some examples, each NOT gate circuit 314 may include an odd number of NOT gates (e.g., phase inverters), for example, one, three, or five NOT gates.

In some examples, as shown in FIG. 16, the AND gate circuit 313 may include a plurality of AND gates 3131, 3132, 3133, and 3134. The plurality of AND gates 3131, 3132, 3133, and 3134 may form multiple stages of subcircuits. In FIG. 16, the AND gates 3131, 3132, and 3133 form a first-stage subcircuit, and the AND gate 3134 forms a second-stage subcircuit. A plurality of input terminals of the AND gate 3132 include the plurality of first input terminals of the AND gate circuit 313. A plurality of input terminals of the AND gates 3131 and 3132 include the plurality of second input terminals of the AND gate circuit 313. An input terminal of the AND gate 3134 is connected with output terminals of the AND gates 3131, 3132, and 3133. An output terminal of the AND gate 3134 is an output terminal of the AND gate circuit 313.

FIG. 17 provides a description by using an example of four address registers and four counters. As shown in FIG. 17, for the four address registers and the four counters, in a current state, stored row addresses and numbers of accesses are as follows: a number of accesses of an address 0XA0 is 0XA7 (10100111), a number of accesses of an address 0XB0 is 0X9F (10011111), a number of accesses of an address 0XC0 is 0XBF (10111111), and a number of accesses of an address 0XD0 is 0XBB (10111011).

When the counting circuit receives the accessed address 0XB0 that is synchronous with a fifth activation command ACT5, the number of accesses of the address 0XB0 in the counting circuit is increased by 1. Therefore, the number of accesses is increased from 0X9F to 0XA0 (10100000).

After the number of accesses of the address 0XB0 is changed to 0XA0 (10100000), values of the most significant bit, the second most significant bit, and the third most significant bits of all counters are correspondingly the same, which are displayed as 101. In this case, the adjustment circuit resets the flip-flops DFF7 and DFF5 corresponding to the most significant bits and the third most significant bits, so that the values of the most significant bits, the second most significant bits, and the third most significant bits of all the counters are changed to 0.

As shown in FIG. 17, before the flip-flops DFF7 and DFF5 are reset, a magnitude order of four first count values is: 0XBF>0XBB>0XA7>0XA0. A row address of a target memory row determined by the largest count value in the four first count values is 0XC0.

After the flip-flops DFF7 and DFF5 are reset, the numbers of accesses of the address 0XA0, the address 0XB0, the address 0XC0, and the address 0XD0 are sequentially 0X07 (00000111), 0X00 (00000000), 0X1F (00011111), and 0X1B (00011011). A magnitude order of the four second count values is: 0X1F>0X1B>0X0A>0X00. The address 0XB0 is an address with the largest number of accesses. Therefore, a memory row corresponding to the address 0XB0 is a target memory row. As can be seen, after the counters are reset, a magnitude relationship of the count values of all the counters remains unchanged. Therefore, the determined target memory row remains unchanged.

FIG. 18 provides an example illustration of eight address registers and eight counters. The eight address registers and the eight counters may include the four address registers and the four counters in FIG. 17. Each counter is an 8-bit binary counter, and has a counting capacity of decimal 256. The most significant bit, the second most significant bit, and the third most significant bit of the first count value are sequentially 1, 0, and 1, which represents that first count value should be equal to or greater than 10100000 (corresponding to decimal 160) and less than 11000000 (corresponding to decimal 192). In this case, the target threshold is greater than or equal to three eighths of a counting capacity of the counter and less than seven eighths of the counting capacity.

The adjustment circuit 300 sets the most significant bits and the third most significant bits corresponding to the flip-flops DFF7 and DFF5 to 0. This is equivalent to that each first count value is decreased by 10100000. As shown in FIG. 18, each first count value is decreased by 10100000. This is equivalent to that a bar chart of the first count value is folded toward a target threshold Th to hide a segment of the bar chart. The obtained magnitude relationship between a plurality of second count value sand the magnitude relationship between a plurality of first count values remain unchanged. Therefore, the adjustment of the counters by the adjustment circuit does not affect determining of the target memory row.

FIG. 19 is a schematic diagram of another row hammer control circuit and another adjustment circuit provided by examples of the present disclosure. FIGS. 20 and 21 are respectively a schematic table and a schematic bar chart before and after count values of a plurality of counters are adjusted by the adjustment circuit shown in FIG. 19. In this example, the preset significant bit includes the most significant bit, the second most significant bit, and the third most significant bit of the first count value, which respectively correspond to a flip-flop DFF7, a flip-flop DFF6, and a flip-flop DFF5. The second most significant bit is a first-type significant bit, and the most significant bit and the third most significant bit are second-type significant bits.

It is the same as FIG. 16 that input terminals of a plurality of NOT gate circuits 314 are connected with output terminals of flip-flops DFF6 corresponding to the second most significant bits in all counters. A plurality of first input terminals of the AND gate circuit 313 are connected with output terminals of the plurality of NOT gate circuits 314. A plurality of second input terminals of the AND gate circuit 313 are connected with flip-flops DFF7 corresponding to the most significant bits and flip-flops DFF5 corresponding to the third most significant bits in all counters. An output terminal of the AND gate circuit 313 is connected with reset terminals of all flip-flops DFF7 and DFF5.

A difference from FIG. 16 is that in this example, the output terminal of the AND gate circuit 313 is further connected with set terminals of all the flip-flops DFF6.

The adjustment unit 310 is configured to send, when output terminals of all the flip-flops DFF6 are at a low level (e.g., indicating that values of the second most significant bits are 0) and output terminals of all the flip-flops DFF7 and DFF5 are at a high level (e.g., indicating that values of the most significant bits and the third most significant bits are all 1), a control signal to reset terminals of each preset flip-flop DFF7 and each preset flip-flop DFF5 and a set terminal of the flip-flop DFF6, so that output terminals of each preset flip-flop DFF7 and each preset flip-flop DFF5 are reset to a low level (e.g., indicating that the values of the most significant bits and the third most significant bits are all 0). The output terminal of each preset flip-flop DFF6 is reset to a high level (e.g., indicating that the values of the second most significant bits are all 1), indicating that the preset values of the preset significant bits are 0, 1, and 0, to obtain a plurality of second count values.

In this example, a control signal applied to the set terminals is a set signal. The set signal includes one effective pulse. The effective pulse has a high level. That is, the set signal is valid at a high level. When the set terminal of the flip-flop receives a high level, the flip-flop is set to set the output terminal to a high-level state.

FIG. 20 provides an example illustration of four address registers and four counters. Current states of the four address registers and the four counters and states after the fifth activation command ACT5 is received are the same as those in FIG. 17. Therefore, details are not described again.

After the number of accesses of the address 0XB0 is changed to 0XA0 (10100000), values of the most significant bit, the second most significant bit, the third most significant bits of all counters are correspondingly the same, and the values of the preset significant bits are displayed as is 1, 0, and 1. In this case, the adjustment unit 310 resets the flip-flops DFF7, DFF6, and DFF5, so that the values of the most significant bits, the second most significant bits, and the third most significant bits of all the counters are sequentially changed to 0, 1, and 0.

After the flip-flops DFF7, DFF6, and DFF5 are reset, the numbers of accesses of the address 0XA0, the address 0XB0, the address 0XC0, and the address 0XD0 are sequentially 0X47 (01000111), 0X40 (01000000), 0X5F (01011111), and 0X5B (01011011). A magnitude order of the four second count values is: 0X5F>0X5B>0X4A>0X40. The address 0XB0 is an address with the largest number of accesses. Therefore, a memory row corresponding to the address 0XB0 is a target memory row. As can be seen, after the counters are reset, a magnitude relationship of the count values of all the counters remains unchanged. Therefore, the determined target memory row remains unchanged.

FIG. 21 provides a description by using an example of eight address registers and eight counters. The adjustment unit 310 changes the values of the most significant bit, the second most significant bit, and the third most significant bits sequentially to 0, 1, and 0. This is equivalent to that an offset value of each first count value is a difference between 10100000 (corresponding decimal 160) and 01000000 (corresponding decimal 64), that is, decimal 96. A dashed box on each counter in FIG. 21 represents the magnitude of the offset value, and all first count values are adjusted by the same offset value (e.g., an offset value is 96). The obtained magnitude relationship between a plurality of second count values and the magnitude relationship between a plurality of first count values remain unchanged. Therefore, the adjustment of the counters by the adjustment circuit does not affect determining of the target memory row.

It should be understood that, in some other examples, the target threshold may be seven eighths of a counting capacity of a counter. For example, the counting capacity is 256 and the target threshold may be 224. Correspondingly, the preset significant bits are the most significant bit, the second most significant bit, and the third most significant bit. When the value of each significant bit in the preset significant bit is 1, the value of each significant bit in the preset significant bit is set to 0.

In some examples, as shown in FIGS. 10, 13, 16, and 19, the adjustment circuit 300 may further include a delay unit 320. One terminal of the delay unit 320 is connected with the output terminal of the adjustment unit 310, and the other terminal is connected with the reset terminals or set terminals of the flip-flops corresponding to the preset significant bits in the plurality of counters 222. The delay unit 320 is configured to increase a pulse width of an effective pulse of the control signal. In other words, the delay unit is configured to increase duration of output terminals of the AND gate circuits 311, 312, and 313 being set to a high level.

As shown in FIG. 10, because there are a large number of preset flip-flops, lengths of lines from the output terminal of the AND gate circuit 311 to the reset terminals of the flip-flops corresponding to each preset significant bit are not completely the same. A flip-flop with a short line may be reset first, and the output terminal of the flip-flop is set to a low level. In this case, the input terminals of the AND gate circuit 311 are not all at a high level. As a result, the output terminal of the AND gate circuit 311 is switched to a low level, and a flip-flop with a long line cannot be reset, and the output terminal of the flip-flop cannot be reset to a low level.

Therefore, in this example, after the delay unit 320 is disposed at the output terminal of the AND gate circuit 311, when a flip-flop with a short line is reset and the output terminal of the AND gate circuit 311 is switched to a low level, the delay unit 320 can delay the time at which the low level reaches a reset terminal of other flip-flop, so that duration of maintaining the high level at the output terminal of the AND gate circuit 311 is increased. That is, a pulse width of the effective pulse of the reset signal is increased, so that all the flip-flops are reset.

It is understood from another perspective that the delay unit 320 has delayed the time at which a signal of the output terminal of the AND gate circuit 311 reaches the reset terminal of the flip-flop, so that the time at which the output terminal of the AND gate circuit 311 is switched from a high level to a low level is delayed. In other words, the duration that the AND gate circuit 311 is set to a high level is increased.

Figure 22:
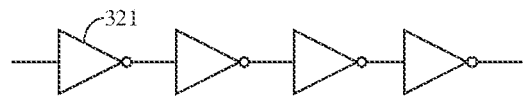
FIG. 22 is a schematic diagram of a delay circuit provided by examples of the present disclosure.

In some examples, as shown in FIG. 22, the delay unit 320 may include an even number of NOT gates 321 connected in series, for example, two NOT gates, four NOT gates, six NOT gates, etc. A number of NOT gates included in the delay unit 320 depends on required increased duration that the output terminal of the AND gate circuit 311 is set to a high level. Therefore, the number may be adjusted according to an actual requirement.

Figure 23:
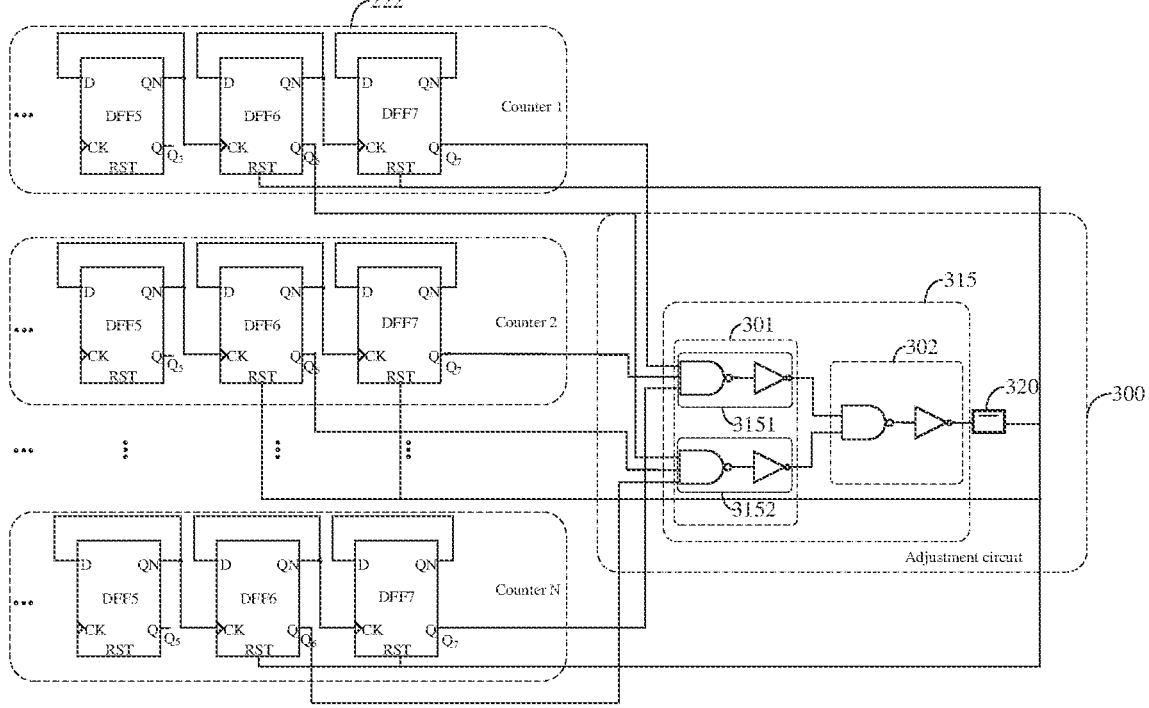
FIG. 23 is a schematic diagram of another adjustment circuit provided by examples of the present disclosure.

FIG. 23 is a schematic diagram of another adjustment circuit provided by examples of the present disclosure. As shown in FIG. 23, the adjustment unit includes an AND gate circuit 315. The AND gate circuit 315 may include multiple stages of subcircuits 301 and 302. Each stage of subcircuit 301 or 302 includes one or more AND gate logic units (e.g., 3151).

Input terminals of a plurality of AND gate logic units in a first-stage subcircuit 301 are connected with output terminals of flip-flops DFF7 and DFF6 corresponding to preset significant bits in a plurality of counters 222. Input terminals of AND gate logic units in a next-stage subcircuit are connected with output terminals of the AND gate logic units in a previous-stage subcircuit. Output terminals of AND gate logic units in the last-stage subcircuit 302 are connected with reset terminals of the flip-flops DFF7 and DFF6 corresponding to the preset significant bits in the plurality of counters 222.

For example, the adjustment circuit 300 further includes a delay unit 320. The delay unit 320 is located between an output terminal of the last-stage subcircuit 302 and the reset terminals of the flip-flops DFF7 and DFF6 corresponding to the preset significant bits in the plurality of counters 222.

In some examples, in the first-stage subcircuit 301, the preset significant bits corresponding to the flip-flops connected with the input terminals of each AND gate logic unit 3151 are the same. As shown in FIG. 23, the first-stage subcircuit 301 includes a first AND gate logic unit 3151 and a second AND gate logic unit 3152. The first AND gate logic unit 3151 is connected with the output terminals of the flip-flops DFF7, and the second AND gate logic unit 3152 is connected with the output terminals of the flip-flops DFF6.

It should be understood that, in some other examples, the preset significant bits corresponding the flip-flops connected with the input terminals of each AND gate logic unit may be different. The input terminal of each AND gate logic unit may be connected with flip-flops corresponding to all preset significant bits of several nearby counters 222.

In some examples, each AND gate logic unit (e.g., 3151) may include four input terminals.

In some examples, each AND gate logic unit (e.g., 3151) may include a NAND gate and a NOT gate that are connected in series.

As shown above, in the example of the present disclosure, an adjustment circuit for counters in a row hammer control circuit is added. The adjustment circuit is only formed by a simple AND gate and NOT gate or NAND gate and NOT gate. Although the circuit is simple, the functions are powerful. Count values of all counters may be folded, so that a counting space of the counters is increased without increasing significant bits of the counters, and the problem of counters becoming stuck because count values of the counters are all in a high-level state can be avoided. In addition, after the adjustment circuit folds the count values of all the counters, a magnitude relationship between these count values is not affected. Therefore, determining of a target memory row by the row hammer control circuit is not affected. Therefore, the function of mitigating the impact of a row hammer effect on the memory cell array by the row hammer control circuit is not affected. In addition, the addition of the adjustment circuit does not affect the row hammer control circuit itself, other circuits in the memory, and circuits such as a memory controller. Therefore, such an improvement has a short validation cycle and low costs.

Figure 24:
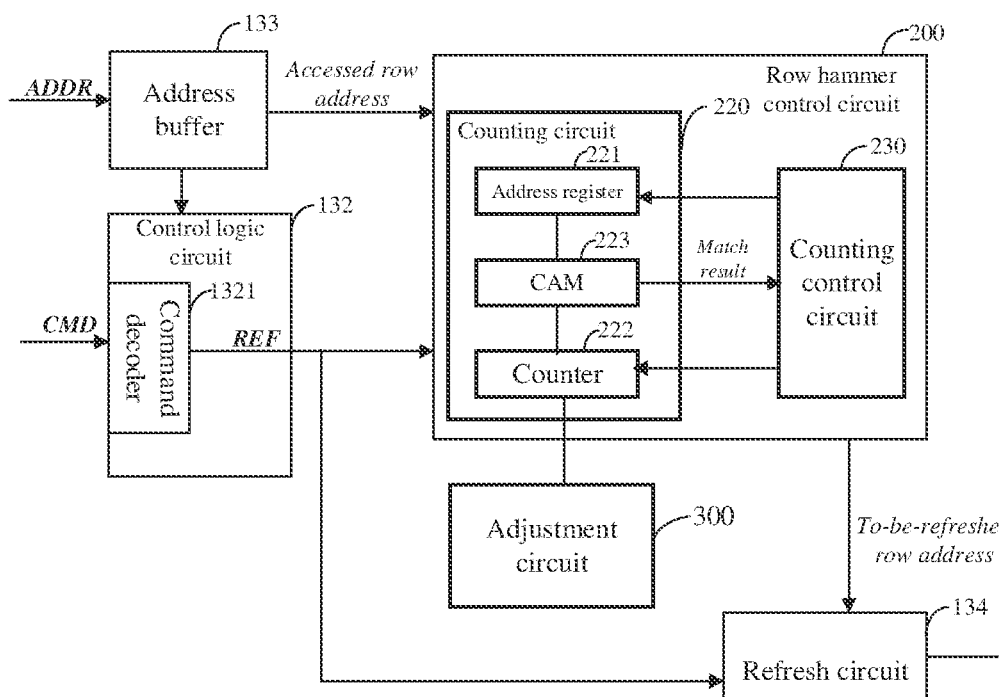
FIG. 24 is a schematic diagram of another row hammer control circuit and another adjustment circuit provided by examples of the present disclosure.
Figure 25:
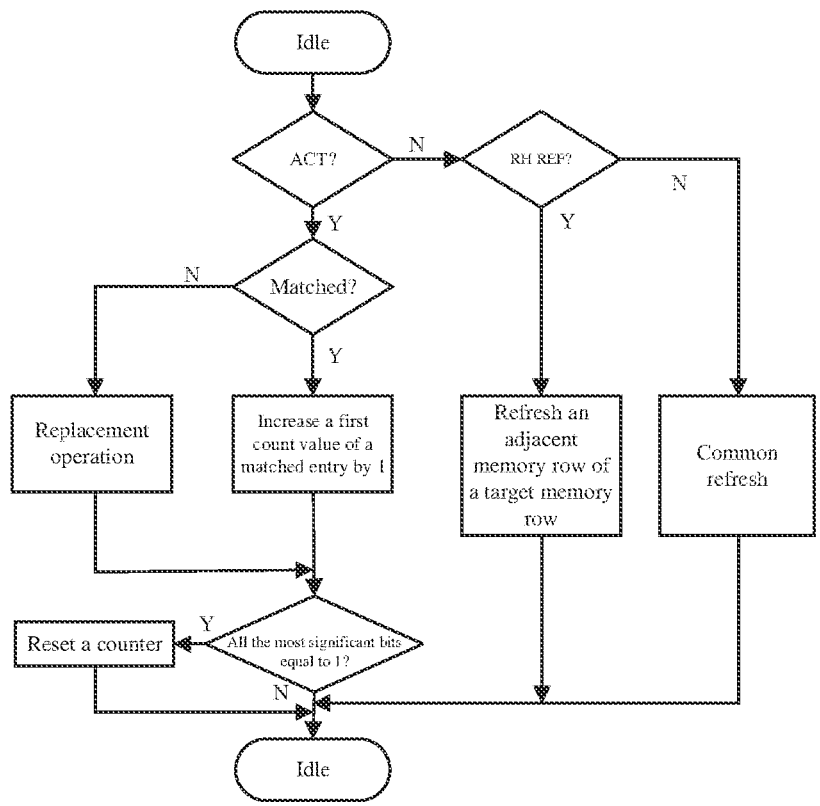
FIG. 25 is a schematic diagram of an operation method of the row hammer control circuit and the adjustment circuit as shown in FIG. 24.

FIG. 24 is a schematic diagram of another row hammer control circuit and another adjustment circuit provided by examples of the present disclosure. FIG. 25 is a schematic diagram of an operation method of the circuits shown in FIG. 24. As shown in FIGS. 24 and 25, when receiving a command CMD from a memory controller, a memory determines whether the command CMD is an activation command ACT.

If the command CMD is an activation command ACT, the command decoder 1321 transmits information about an accessed row address included in row address information that is synchronous with the activation command ACT to the counting circuit 220, in this case.

After receiving an accessed row address, the counting circuit 220 matches the accessed row address against the row addresses stored in all the address registers 221, to obtain a matching result.

When the matching result is that the accessed row address is the same as a row address stored in a first address register 221, a count value of a counter 222 corresponding to the first address register 221 is increased by 1. That is, an increase operation is performed.

When the matching result is that the accessed row address is the same as none of the row addresses stored in all the address registers 221, a row address in a second address register 221 with the smallest number of accesses is replaced with the accessed row address, and a count value of the counter 222 corresponding to the second address register 221 is increased by 1. That is, a replacement operation is performed.

If the command CMD is not an activation command ACT, the command decoder 1321 continues to determine whether the command CMD is a refresh command REF. If the command CMD is a refresh command REF, the command CMD is provided to the row hammer control circuit 200. The row hammer control circuit 200 further determines whether the refresh command is a row hammer refresh command RH REF. A determining manner is discussed above, and details are not described again.

With continued reference to FIGS. 24 and 25, if the command CMD is a row hammer refresh command RH REF, the row hammer control circuit 200 indicates a target row address with the largest number of accesses, determines a to-be-refreshed row address according to the target row address, and transmits the to-be-refreshed row address to the refresh circuit 134, in this case. A memory row corresponding to the row address with the largest number of accesses is the target memory row, and a memory row corresponding to the to-be-refreshed row address is a victim row.

The refresh circuit 134 performs a refresh operation on the adjacent memory row of the target memory row in response to the refresh command REF and the to-be-refreshed row address.

After the refresh circuit 134 performs a refresh operation on the to-be-refreshed row address, the counting circuit 220 resets a number of accesses of the row address with the largest number of accesses to the smallest number of accesses in all the address registers 221. That is, an additional refresh operation is performed.

Both the increase operation and the replacement operation above increase a first count value. Therefore, after the two operations, the adjustment circuit 300 determines whether first count values of all the counters 222 are greater than or equal to the target threshold. For example, the adjustment circuit 300 determines whether the values of the most significant bits of all the counters 222 are 1. When the first count values of all the counters 222 are greater than or equal to the target threshold, for example, the values of the most significant bits of all the counters 222 are all 1, the adjustment circuit 300 resets the plurality of counters 222, to obtain second count values. When a condition that the first count values of all the counters 222 are greater than or equal to the target threshold is not met, the adjustment circuit 300 does not perform an operation.

It should be understood that, the adjustment of the plurality of counters 222 by the adjustment circuit 300 may be performed after either of the two operations. Regardless of which operation is performed by the counting circuit 220, the adjustment circuit 300 resets the counters provided that a condition is satisfied, to obtain second count values.

As can be known from FIGS. 24 and 25, an operation on the counter 222 by the adjustment circuit 300 does not affect determining of a row address with the smallest number of accesses in the replacement operation by the counting control circuit 230, and a row address with the largest number of accesses is determined in the additional refresh operation. Therefore, the adjustment circuit 300 does not affect an operation process of the row hammer control circuit 200.

With continued reference to FIGS. 24 and 25, if the refresh command REF is not a row hammer refresh command RH REF, it is determined that the refresh command REF is a common refresh command REF. The refresh circuit 134 performs a common refresh operation according to the common refresh command REF. For example, the refresh circuit 134 performs a refresh operation on memory rows in a particular order.

Figure 26:
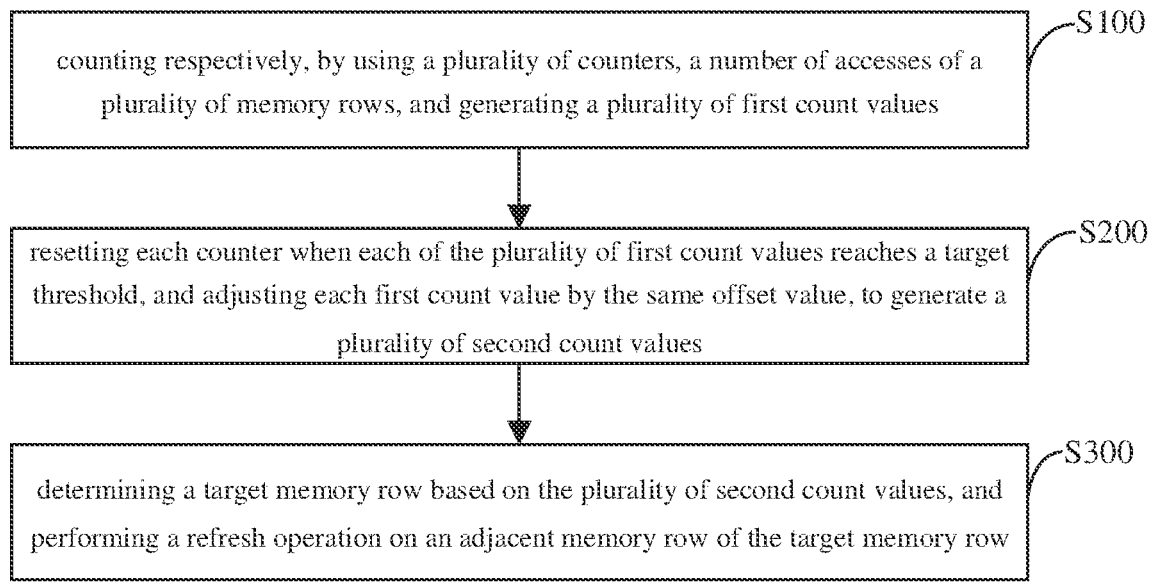
FIG. 26 is a schematic flowchart of an operation method of a memory provided by examples of the present disclosure.

Examples of the present disclosure further provide a method of operating a memory. FIG. 26 is a schematic flowchart of a method of operating a memory provided by examples of the present disclosure. As shown in FIG. 26, the method may include operations S100, S200, and S300. At S100, the method may include counting respectively, by using a plurality of counters, a number of accesses of a plurality of memory rows, and generating a plurality of first count values. At S200, the method may include resetting each counter when each of the plurality of first count values reaches a target threshold, and adjusting each first count value by the same offset value, to generate a plurality of second count values. At S300, the method may include determining a target memory row based on the plurality of second count values, and performing a refresh operation on an adjacent memory row of the target memory row.

In some examples, each counter includes a plurality of flip-flops. Each flip-flop corresponds to one significant bit of the first count value. Levels of output terminals of the flip-flops indicate values of the significant bits. Operation S200 may include resetting levels of output terminals of flip-flops corresponding to the preset significant bits, to set values of the preset significant bits to preset values when values of preset significant bits of the significant bits of the plurality of first count values are the same. The first count values for which the preset significant bits are reset may be updated to the second count values.

In some examples, preset significant bits of each first count value may include one or more significant bits.

In some examples, the preset significant bits may be most significant bits of the plurality of significant bits of the first count values.

In some examples, the preset significant bits may include a plurality of significant bits sequentially set from most significant bits to low significant bits of the first count values, and a number of significant bits of the preset significant bits is less than a number of significant bits of the first count values. For example, the preset significant bits may include most significant bits and second most significant bits. In another example, the preset significant bits may include most significant bits, second most significant bits, and third most significant bits.

In some examples, the memory includes an adjustment circuit. The adjustment circuit includes: an adjustment unit. A plurality of input terminals of the adjustment unit are connected with output terminals of flip-flops corresponding to the preset significant bits in the plurality of counters, and an output terminal of the adjustment unit is connected with reset terminals or set terminals of flip-flops corresponding to the preset significant bits in the plurality of counters. In an example, operation S200 may include, when values of preset significant bits of the plurality of first count values are the same, sending a control signal to reset terminals or set terminals of flip-flops corresponding to the preset significant bits, to set values of the preset significant bits to preset value.

In some examples, the initial value of each significant bit of the preset significant bit is 0. In an example, operation S200 may include, when the value of each significant bit in the preset significant bits of the plurality of first count values is 1, sending a control signal to the reset terminal of each flip-flop corresponding to the preset significant bit, to set the value of each significant bit of the preset significant bits to 0, so that preset significant bits are set to the initial values, to obtain a plurality of second count values.

In some examples, the high level of the output terminal of the flip-flop indicates that the value of the significant bit is 1, and the low level of the output terminal of the flip-flop indicates that the value of the significant bit is 0. The initial value of the significant bit is 0.

In some examples, the adjustment unit includes an AND gate circuit. A plurality of input terminals of the AND gate circuit are respectively connected with output terminals of flip-flops corresponding to preset significant bits in the plurality of counters, and an output terminal of the AND gate circuit is connected with reset terminals of flip-flops corresponding to preset significant bits in the plurality of counters. In an example, operation S200 may include, when levels of output terminals of flip-flops corresponding to preset significant bits in the plurality of counters are the same and a level of an output terminal of a flip-flop corresponding to each significant bit of the preset significant bits is different from an initial level, sending the control signal to reset terminals of flip-flops corresponding to the preset significant bits, to set output terminals of flip-flops corresponding to the preset significant bits to the initial level. The initial level indicates the initial values.

In some examples, the preset significant bits include first-type significant bits and second-type significant bits, and the adjustment unit may include a NOT gate circuit and an AND gate circuit. A plurality of input terminals of the NOT gate circuit are connected with output terminals of flip-flops corresponding to first-type significant bits in the plurality of counters, and an AND gate circuit including first input terminals and a plurality of second input terminals. The first input terminals are connected with output terminals of the NOT gate circuits, the plurality of second input terminals are connected with output terminals of flip-flops corresponding to second-type significant bits in the plurality of counters, and an output terminal of the AND gate circuit is connected with reset terminals of flip-flops corresponding to second-type significant bits in the plurality of counters. In an example, operation S200 may include, when levels of output terminals of flip-flops corresponding to first-type significant bits in the plurality of counters are equal to an initial level, and levels of the output terminals of flip-flops corresponding to the second-type significant bits are the same and are different from the initial level, sending the control signal to reset terminals of flip-flops corresponding to second-type significant bits, to set levels of output terminals of flip-flops corresponding to the second-type significant bits to the initial level.

In some examples, the control signal includes one effective pulse. The memory further includes a delay unit. The delay unit is connected with an output terminal of the adjustment unit and reset terminals or set terminals of flip-flops corresponding to a plurality of preset significant bits. Correspondingly, the operation method may further include increasing a pulse width of an effective pulse of the control signal.

In some examples, the control signal includes a reset signal and a set signal. Effective pulses of the reset signal and the set signal have high levels. That is, the reset signal the and control signal are both valid at a high level. The increasing a pulse width of an effective pulse of the control signal may include increasing duration that the output terminal of the adjustment unit is set to a high level.

In the operation method of a memory provided by the examples of the present disclosure, when first count values of a plurality of counters in a row hammer control circuit reach a target threshold, the plurality of counters are reset, and each first count value is adjusted by the same offset value to obtain a second count value. The row hammer control circuit determines a target memory row according to the plurality of second count values, and performs a refresh operation on an adjacent memory row of the target memory row. The operation method does not affect operations of the row hammer control circuit. A remaining counting space of the counters can be increased after the counters are reset, so that a problem that the counters are stuck because count values of counters are all in a high-level state is avoided.

The above descriptions are merely specific implementations of the present disclosure, and the protection scope of the present disclosure is not limited thereto. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:

1. A memory, comprising:
   a row hammer control circuit comprising a plurality of counters, each of the plurality of counters being configured to:
      count a number of accesses of one memory row; and
      generate a first count value; and
   an adjustment circuit connected with the plurality of counters and configured to:
      reset each of the plurality of counters when each of a plurality of first count values reaches a target threshold; and
      adjust each of the first count values by a same offset value to generate a plurality of second count values, wherein the row hammer control circuit is further configured to determine a target memory row according to the plurality of second count values.

2. The memory of claim 1, wherein:
   each of the plurality of counters comprises a plurality of flip-flops each corresponding to one significant bit of the first count value, and levels of output terminals of the flip-flops indicate values of the significant bits, and when values of preset significant bits of the significant bits of the plurality of first count values are the same, the adjustment circuit is configured to:
      reset levels of output terminals of flip-flops corresponding to the preset significant bits, to set values of the preset significant bits to preset values, the first count values for which the preset significant bits are reset being updated to the second count values.

3. The memory of claim 2, wherein preset significant bits of each of the first count values comprise one significant bit or a plurality of significant bits.

4. The memory of claim 2, wherein:
   the preset significant bits are most significant bits of the plurality of significant bits of the first count values, or
   the preset significant bits comprise a plurality of significant bits sequentially set from most significant bits to low significant bits of the first count values, and a number of significant bits of the preset significant bits is less than a number of significant bits of the first count values.

5. The memory of claim 2, wherein:
   the adjustment circuit comprises an adjustment unit,
   a plurality of input terminals of the adjustment unit are connected with output terminals of flip-flops corresponding to the preset significant bits in the plurality of counters,
   an output terminal of the adjustment unit is connected with reset terminals or set terminals of flip-flops corresponding to the preset significant bits in the plurality of counters, and
   when values of preset significant bits of the plurality of first count values are the same, the adjustment unit is configured to:
      send a control signal to reset terminals or set terminals of flip-flops corresponding to the preset significant bits, to set values of the preset significant bits to preset values.

6. The memory of claim 5, wherein:
   the preset values are initial values of the preset significant bits, and
   the adjustment unit is configured to:
      send the control signal to the reset terminals of flip-flops corresponding to the preset significant bits, to set values of the preset significant bits to the initial values.

7. The memory of claim 6, wherein:
   the adjustment unit comprises an AND gate circuit,
   a plurality of input terminals of the AND gate circuit are respectively connected with output terminals of flip-flops corresponding to preset significant bits in the plurality of counters,
   an output terminal of the AND gate circuit is connected with reset terminals of flip-flops corresponding to preset significant bits in the plurality of counters, and
   when levels of output terminals of flip-flops corresponding to preset significant bits in the plurality of counters are the same and a level of the output terminal of the flip-flop corresponding to each significant bit of the preset significant bits is different from an initial level, the adjustment unit is configured to:
      send the control signal to reset terminals of flip-flops corresponding to the preset significant bits, to set output terminals of flip-flops corresponding to the preset significant bits to the initial level, and the initial level indicates the initial values.

8. The memory of claim 6, wherein:
the preset significant bits comprise first-type significant bits and second-type significant bits,
the adjustment unit comprises:
   a plurality of NOT gate circuits, the input terminals of the plurality of NOT gate circuits being connected with output terminals of flip-flops corresponding to first-type significant bits in the plurality of counters; and
   an AND gate circuit comprises:
      a plurality of first input terminals and a plurality of second input terminals, the first input terminals being connected with output terminals of the NOT gate circuits, the plurality of second input terminals being connected with output terminals of flip-flops corresponding to second-type significant bits in the plurality of counters, and an output terminal of the AND gate circuit being connected with reset terminals of flip-flops corresponding to second-type significant bits in the plurality of counters,
   wherein when levels of output terminals of flip-flops corresponding to first-type significant bits in the plurality of counters are equal to an initial level, and levels of the output terminals of flip-flops corresponding to the second-type significant bits are the same and are different from the initial level, the adjustment unit is configured to:
      send the control signal to reset terminals of flip-flops corresponding to the second-type significant bits, to set levels of output terminals of flip-flops corresponding to the second-type significant bits to the initial level.

9. The memory of claim 5, wherein:
the control signal comprises one effective pulse,
the adjustment circuit further comprises a delay unit,
one terminal of the delay unit is connected with an output terminal of the adjustment unit,
the other terminal is connected with the reset terminals or the set terminals of flip-flops corresponding to preset significant bits in the plurality of counters, and
the delay unit is configured to:
   increase a pulse width of the effective pulse.

10. The memory of claim 1, wherein:
the row hammer control circuit is configured to:
   compare the plurality of second count values; and
   determine a memory row corresponding to a largest count value of the plurality of second count values as the target memory row,
the row hammer control circuit is further configured to:
   determine an adjacent memory row of the target memory row according to the target memory row,
the memory further comprises a refresh circuit connected with the row hammer control circuit, and
the refresh circuit is configured to:
   perform a refresh operation on the adjacent memory row of the target memory row.

11. A memory system, comprising:
a memory, comprising:
   a row hammer control circuit comprising a plurality of counters, each of the plurality of counters being configured to:
      count a number of accesses of one memory row; and
      generate a first count value; and
   an adjustment circuit connected with the plurality of counters and configured to:
      reset each of the plurality of counters when each of a plurality of first count values reaches a target threshold; and
      adjust each of the first count values by a same offset value to generate a plurality of second count values,
      wherein the row hammer control circuit is further configured to determine a target memory row according to the plurality of second count values; and
a memory controller connected with the memory and configured to control the memory.

12. The memory system of claim 11, wherein:
each of the plurality of counters comprises a plurality of flip-flops each corresponding to one significant bit of the first count value, and levels of output terminals of the flip-flops indicate values of the significant bits, and
when values of preset significant bits of the significant bits of the plurality of first count values are the same, the adjustment circuit is configured to:
   reset levels of output terminals of flip-flops corresponding to the preset significant bits, to set values of the preset significant bits to preset values, the first count values for which the preset significant bits are reset being updated to the second count values.

13. The memory system of claim 12, wherein preset significant bits of each of the first count values comprise one significant bit or a plurality of significant bits.

14. The memory system of claim 12, wherein:
the preset significant bits are most significant bits of the plurality of significant bits of the first count values, or
the preset significant bits comprise a plurality of significant bits sequentially set from most significant bits to low significant bits of the first count values, and a number of significant bits of the preset significant bits is less than a number of significant bits of the first count values.

15. A method of operating a memory, comprising:
counting respectively, by using a plurality of counters, numbers of accesses of a plurality of memory rows;
generating, by using the plurality of counters, a plurality of first count values;
resetting each of the plurality of counters when each of the plurality of first count values reaches a target threshold;
adjusting each of the first count values by a same offset value to generate a plurality of second count values;
determining a target memory row based on the plurality of second count values; and
performing a refresh operation on an adjacent memory row of the target memory row.

16. The method of claim 15, wherein:
each of the plurality of counters comprises a plurality of flip-flops each corresponding to one significant bit of the first count value, and levels of output terminals of the flip-flops indicate values of the significant bits, and
the resetting each of the plurality of counters when each of the plurality of first count values reaches the target threshold comprises:
   resetting levels of output terminals of flip-flops corresponding to preset significant bits to set values of the preset significant bits to preset values when values of preset significant bits of significant bits of the plurality of first count values are the same, wherein the first count values for which the preset significant bits are reset are updated to the second count values.

17. The method of claim 16, wherein preset significant bits of each of the first count values comprise one significant bit or a plurality of significant bits.

18. The method of claim 16, wherein:
the preset significant bits are most significant bits of a plurality of significant bits of the first count values, or
the preset significant bits comprise a plurality of significant bits sequentially set from most significant bits to low significant bits of the first count values, and a number of significant bits of the preset significant bits is less than a number of significant bits of the first count values.

19. The method of claim 16, wherein:
the memory comprises an adjustment circuit,
the adjustment circuit comprises an adjustment unit,
a plurality of input terminals of the adjustment unit are connected with output terminals of flip-flops corresponding to the preset significant bits in the plurality of counters,
an output terminal of the adjustment unit is connected with reset terminals or set terminals of flip-flops corresponding to the preset significant bits in the plurality of counters, and
the resetting the levels of output terminals of flip-flops corresponding to the preset significant bits to set values of the preset significant bits to preset values when values of preset significant bits in significant bits of the plurality of first count values are the same comprises:
when values of preset significant bits of the plurality of first count values are the same, sending a control signal to reset terminals or set terminals of flip-flops corresponding to the preset significant bits, to set values of the preset significant bits to preset values.

20. The method of claim 19, wherein:
the adjustment circuit further comprises a delay unit,
one terminal of the delay unit is connected with the output terminal of the adjustment unit, the other terminal is connected with the reset terminals or the set terminals of flip-flops corresponding to preset significant bits in the plurality of counters,
the control signal comprises one effective pulse, and
the method further comprises:
increasing a pulse width of the effective pulse of the control signal.

* * * * *